(12) United States Patent
Yoshida

(10) Patent No.: US 9,766,756 B2
(45) Date of Patent: Sep. 19, 2017

(54) TOUCH PANEL AND DISPLAY DEVICE COMPRISING THE SAME

(71) Applicant: NLT Technologies, Ltd., Kanagawa (JP)

(72) Inventor: Hitoshi Yoshida, Kanagawa (JP)

(73) Assignee: NLT TECHNOLOGIES, LTD., Kawasaki, Kanagawa (JP)

( * ) Notice: Subject to any disclaimer, the term of this patent is extended or adjusted under 35 U.S.C. 154(b) by 34 days.

(21) Appl. No.: 14/149,213

(22) Filed: Jan. 7, 2014

(65) Prior Publication Data

US 2014/0198066 A1   Jul. 17, 2014

(30) Foreign Application Priority Data

Jan. 15, 2013   (JP) .................................. 2013-004722

(51) Int. Cl.
  *G09G 1/00*   (2006.01)
  *G06F 3/044*   (2006.01)

(52) U.S. Cl.
  CPC .... *G06F 3/044* (2013.01); *G06F 2203/04103* (2013.01); *G06F 2203/04107* (2013.01)

(58) Field of Classification Search
  CPC ............. G02F 1/1333; G02F 1/133308; G02F 1/13332; G02F 1/133334; G02F 1/13338; G06F 3/041; G06F 3/0416; G06F 2203/04107; G06F 3/044
  USPC .............................. 349/58, 59; 361/799–818
  See application file for complete search history.

(56) References Cited

U.S. PATENT DOCUMENTS

| | | | | |
|---|---|---|---|---|
| 5,548,306 | A | * | 8/1996 | Yates, IV ................ G06F 3/044 345/174 |
| 5,579,036 | A | * | 11/1996 | Yates, IV ................ G06F 3/044 178/18.06 |
| 6,556,189 | B1 | * | 4/2003 | Takahata et al. ............. 345/173 |

(Continued)

FOREIGN PATENT DOCUMENTS

| | | |
|---|---|---|
| CN | 101813844 A | 8/2010 |
| CN | 101968702 A | 2/2011 |

(Continued)

OTHER PUBLICATIONS

Communication dated Apr. 28, 2017 from the State Intellectual Property Office of the P.R.C. in counterpart Application No. 201410016389.9.

*Primary Examiner* — Michael Faragalla
(74) *Attorney, Agent, or Firm* — Sughrue Mion, PLLC

(57) ABSTRACT

To shield the noise generated due to deformation or the like of the conductive frame. The touch panel includes: a detection region which generates detection signals according to a contact position of a conductor; a plurality of detection electrodes which output detection signals generated in the detection region; a conductive frame which covers above the outer side of the detection region and above the detection electrode; and shield electrodes formed on the outer side of the detection region on the CF substrate and between each of the plurality of detection electrodes, to which shield signals for shielding the electric influence on the detection region and the detection electrodes are supplied. Further, the distance between the shield electrodes and the detection region is shorter than distance between the conductive frame and the detection region.

12 Claims, 30 Drawing Sheets

(56) References Cited

U.S. PATENT DOCUMENTS

| | | | |
|---|---|---|---|
| 2001/0010569 A1* | 8/2001 | Jin | G02F 1/133308 349/58 |
| 2006/0197753 A1* | 9/2006 | Hotelling | G06F 1/1626 345/173 |
| 2010/0013775 A1* | 1/2010 | Son | G06F 3/044 345/168 |
| 2010/0182275 A1* | 7/2010 | Saitou | G06F 3/044 345/174 |
| 2010/0220071 A1* | 9/2010 | Nishihara | G06F 3/0416 345/173 |
| 2011/0018560 A1* | 1/2011 | Kurashima | G06F 3/044 324/679 |
| 2011/0080376 A1* | 4/2011 | Kuo | G06F 3/0412 345/177 |
| 2012/0063113 A1 | 3/2012 | Hisakawa et al. | |
| 2012/0081328 A1* | 4/2012 | Kandziora | G06F 3/0412 345/174 |

FOREIGN PATENT DOCUMENTS

| | | |
|---|---|---|
| CN | 102804114 A | 11/2012 |
| JP | 2010-218542 A | 9/2010 |

\* cited by examiner

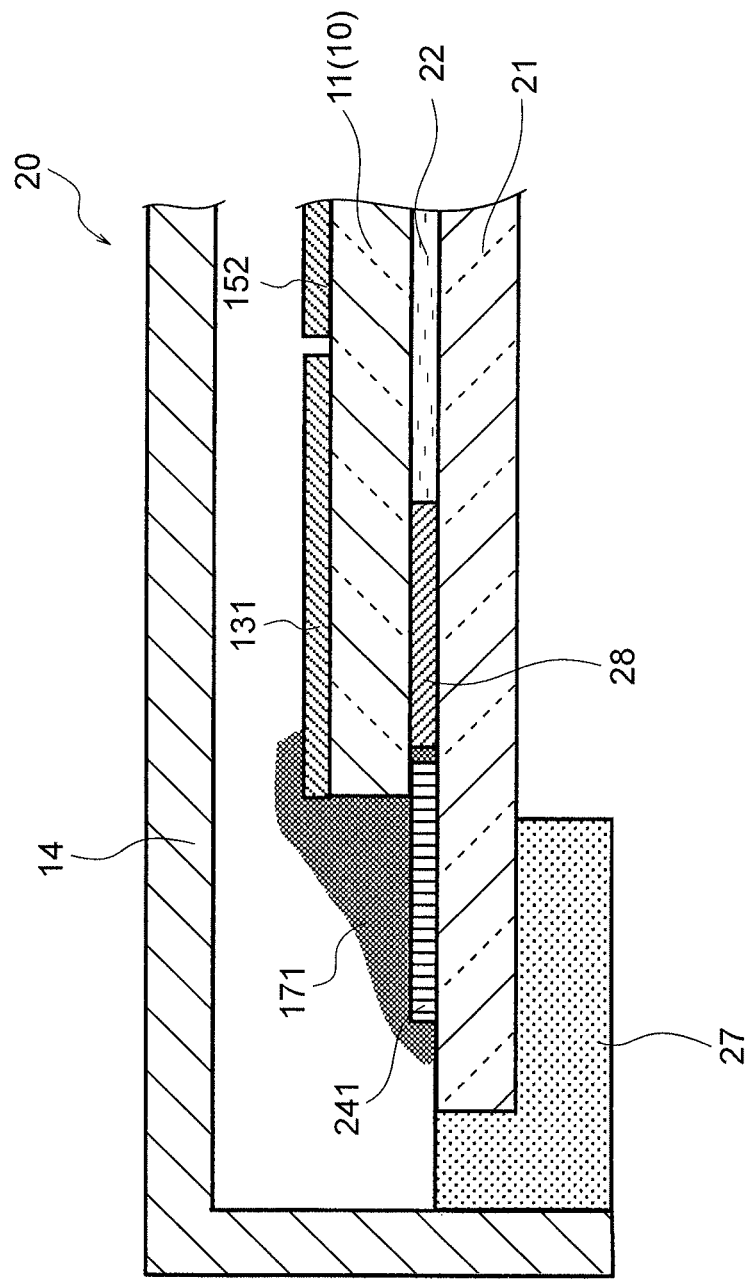

REFERENCE SIGNAL OF
DETECTION SIGNAL
SHIELD SIGNAL
FIG. 8B SINE WAVE 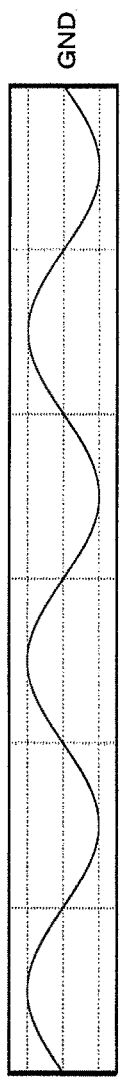
FIG. 8C SQUARE WAVE 
FIG. 8D TRIANGLE WAVE 
FIG. 8E SAWTOOTH WAVE 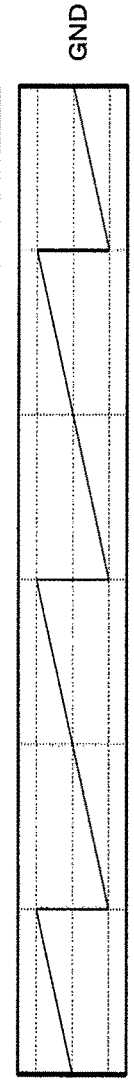
FIG. 8F DIRECT CURRENT 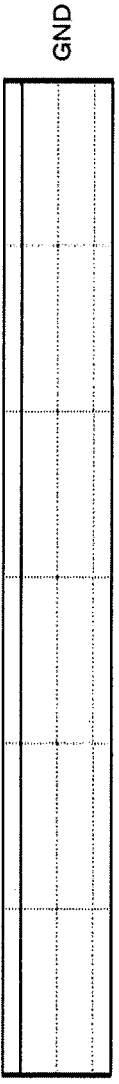
FIG. 8G GND 

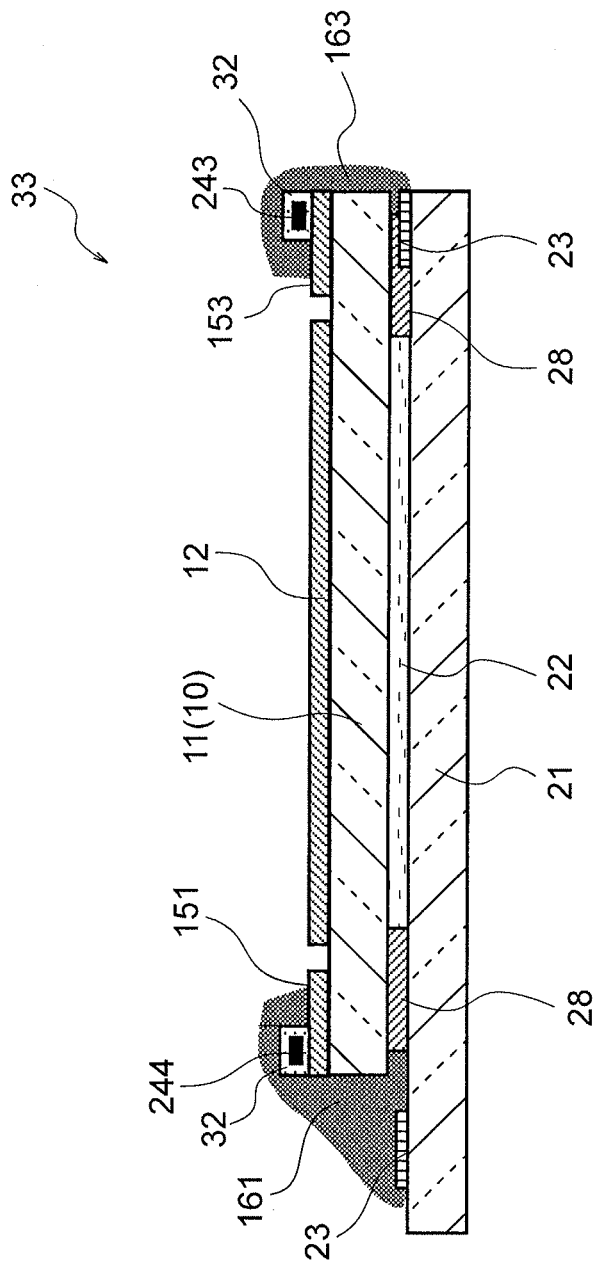

TOUCH PANEL AND DISPLAY DEVICE COMPRISING THE SAME

CROSS-REFERENCE TO RELATED APPLICATION

This application is based upon and claims the benefit of priority from Japanese patent application No. 2013-004722, filed on Jan. 15, 2013, the disclosure of which is incorporated herein in its entirety by reference.

BACKGROUND OF THE INVENTION

1. Field of the Invention

The present invention relates to a touch panel with which information is inputted by touching the panel with a finger or the like and to a display device having the touch panel.

2. Description of the Related Art

Recently, a display device with a touch panel acquired by combining the touch panel to a display input device such as a ticket-vending machine is being broadly put into practical use. With the display device having the touch panel, buttons to be touched are displayed on the display device. When those parts are pressed by a finger or the like, the fact that it is being pressed is detected and information is inputted. Further, the display device switches the image to be displayed based on the inputted information and executes a next input or other actions.

For such display device having that type of touch panel, not only the high definition of the display but also the high precision for detecting a touch input is required. Thus, there has been an increasing demand for taking a measure for the noise so as to prevent malfunctions and the like of touch signals.

Japanese Unexamined Patent Publication 2010-218542 (FIG. 1 and FIG. 10) (Patent Document 1) discloses a technique for providing a shield electrode in the outer periphery of the touch panel (referred to as "related technique 1" hereinafter) as a measure taken for the noise in a capacitance type touch panel. FIG. 29 shows the touch panel of the related technique 1, in which FIG. 29A is a plan view and FIG. 29B is a sectional view taken along a line X-X' of FIG. 29A. Hereinafter, explanations will be provided by referring to those drawings.

In a touch panel 101 of the related technique 1, a detection region 104 is provided on a surface 103 of a substrate 102, and a wiring region 106 is provided on the outer side of the detection region 104. A plurality of detection electrodes 105 electrically isolated from each other for detecting existence of a conductor are formed in the detection region 104. A wiring electrode 107 electrically connected to the detection electrodes 105 and transmits a detection signal is formed in the wiring region 106. Further, a shield electrode 108 for shielding a noise intruded from outside is formed on the outer side of the detection region 104 and the wiring region 106, i.e., on the outer periphery of the substrate 102. In a case where other terminals or elements are disposed at the end part of the substrate 102, the shield electrode 108 may be formed by excluding such part where the terminals or elements are disposed. However, while the shield electrode 108 may be provided by being missed out partially as described above, the shield electrode 108 needs to be formed roughly about 70% or more of the entire outer periphery of the substrate 102.

Further, Patent Document 1 also discloses a technique which provides a conductive frame in addition to the shield electrode to the outer periphery of the touch panel (referred to as "related technique 2" hereinafter) as a measure taken for the noise in a capacitance type touch panel.

FIG. 30 is a sectional view showing the touch panel and the display device of the related technique 2. Hereinafter, explanations will be provided by referring to the drawing.

A touch panel 101 of the related technique 2 is almost in a same structure as that of the touch panel of the related technique 1. A detection region 104, a wiring region 106, a shield electrode 108, and the like are formed on a substrate 102. Further, underneath the touch panel 101, a liquid crystal display device 120 as the display device is provided. The liquid crystal display device 120 includes a liquid crystal panel 121, a translucent shield electrode 122, a light-shielding shield electrode 123, a conductor 124, a polarization plate 128, and the like. Further, from the above the shield electrode 108 and the wiring region 106, a conductive frame 127 is provided by surrounding a side-face outer periphery part 113 of the touch panel 101 and a side-face outer periphery part 125 of the liquid crystal display device 120. The related technique 2 is designed to further shield the electromagnetic noise and the static electricity for the touch panel 101 by providing the conductive frame 127 in addition to the shield electrode 108.

However, there are following issues regarding the related technique 2.

With the related technique 2, the wiring region 106 is provided on the outer side of the detection region 104, the shield electrode 108 is further provided in the outer periphery thereof, and the conductive frame 127 is provided above the wiring region 106 and the shield electrode 108. Thus, when a force by a finger or the like is applied and the conductive frame 127 is deformed, the distance between the conductive frame 127 and the wiring region 106 is changed so that the capacitance between the wiring region 106 and the conductive frame 127 is changed. This change in the capacitance becomes the noise of the touch signal flown in the wiring region 106, i.e., the noise of the detection signal.

That is, the shield electrode 108 is provided on the outer side of the wiring region 106 with the related technique 2, so that the distance from the detection region 104 to the shield electrode 108 becomes longer than the distance from the detection region 104 to the conductive fame 127. Thus, when a noise generated due to deformation of the conductive frame 127 is generated on the inner side than the shield electrode 108, i.e., on the detection region 104 side and the wiring region 106 side, the noise cannot be shielded by the shield electrode 108.

It is therefore an object of the present invention to provide a touch panel capable of shielding the noise generated due to deformation or the like of the conductive frame and to provide a display device having such touch panel.

SUMMARY OF THE INVENTION

The touch panel according to an exemplary aspect of the invention includes: a substrate; a detection region formed in a center side of the substrate, which generates a detection signal according to a contact position of a conductor; a plurality of detection electrodes formed in a fringe side of the substrate, which output the detection signal generated in the detection region; a conductive frame that covers above an outer side of the detection region on the substrate; and a shield electrode formed on the outer side of the detection region and between each of the plurality of detection electrodes, to which a shield signal that shields an electric influence for the detection region is supplied, wherein distance from the detection region to the shield electrode is shorter than distance from the detection region to the conductive frame.

The display device according to another exemplary aspect of the invention includes the touch panel according to the present invention.

BRIEF DESCRIPTION OF THE DRAWINGS

FIG. 4 is a sectional view showing a part of a section taken along a line IV-IV of FIG. 2;

FIGS. 5A and 5B show a manufacturing method of the display device according to the first exemplary embodiment, in which FIG. 5A is a plan view and FIG. 5B is a sectional view showing a part of a section taken along a line VB-VB of FIG. 5A;

FIGS. 6A and 6B show the manufacturing method of the display device according to the first exemplary embodiment, in which FIG. 6A is a plan view and FIG. 6B is a sectional view showing a part of a section taken along a line VIB-VIB of FIG. 6A;

FIGS. 7A and 7B show the manufacturing method of the display device according to the first exemplary embodiment, in which FIG. 7A is a plan view and FIG. 7B is a sectional view showing a part of a section taken along a line VIIB-VIIB of FIG. 7A;

FIG. 8A to 8G is a waveform chart showing shield signals used in the touch panel and the display device according to the first exemplary embodiment;

FIG. 26 is a sectional view taken along a line XXVI-XXVI of FIG. 25;

FIGS. 29A and 29B show a touch panel of a related technique 1, in which FIG. 29A is a plan view and FIG. 29B is a sectional view taken along a line X-X' of FIG. 29A.

DETAILED DESCRIPTION OF THE PREFERRED EMBODIMENTS

Figure 1:
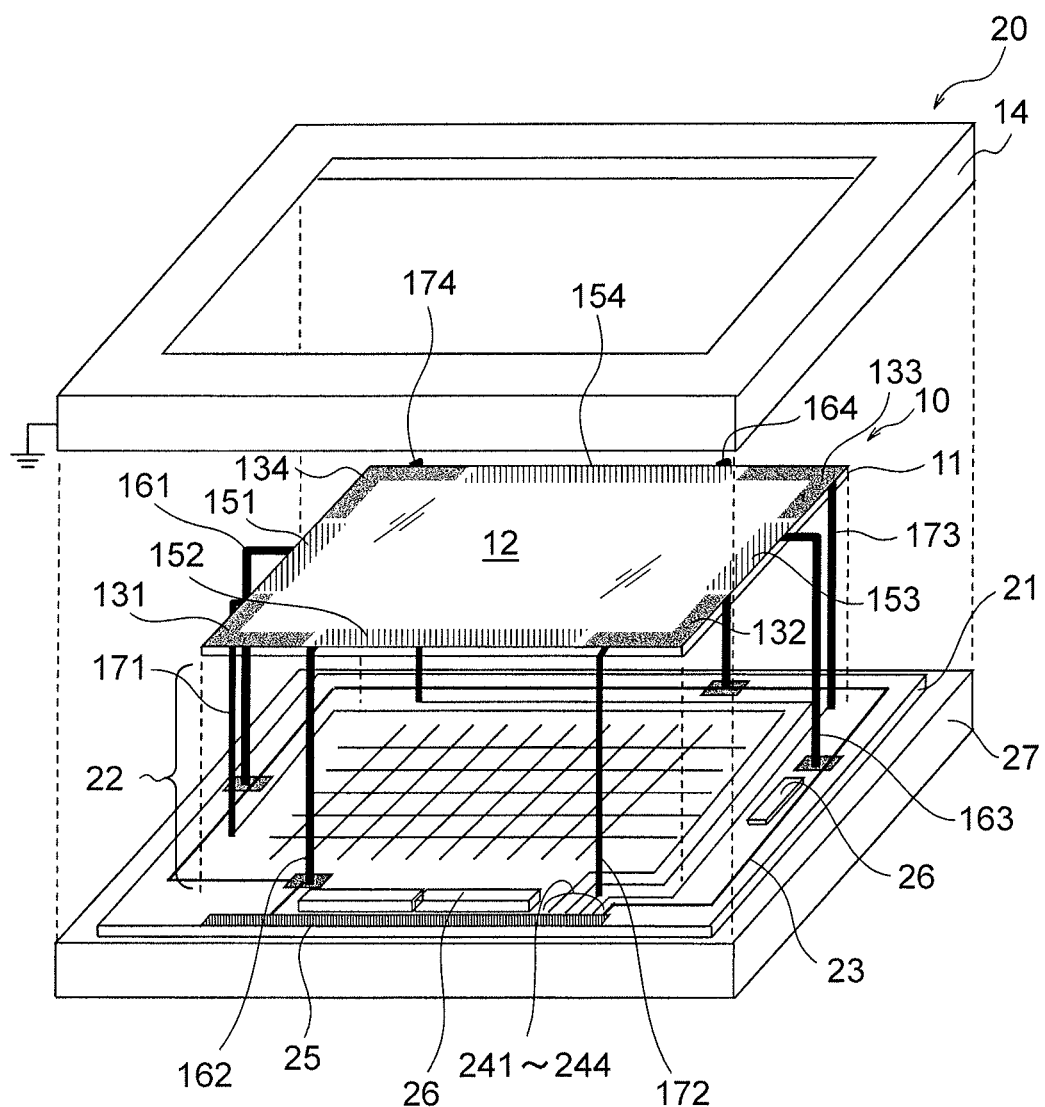
FIG. 1 is a fragmented perspective view showing a touch panel and a display device according to a first exemplary embodiment.

Hereinafter, modes for carrying out the present invention (referred to as "exemplary embodiments" hereinafter) will be described by referring to the accompanying drawings. In this Specification and the drawings, same reference numerals are used for substantially the same structural elements. The shapes in the drawings are illustrated to be easily comprehended by those skilled in the art, so that the dimensions and ratios thereof do not necessarily correspond to actual ones.

Figure 2:
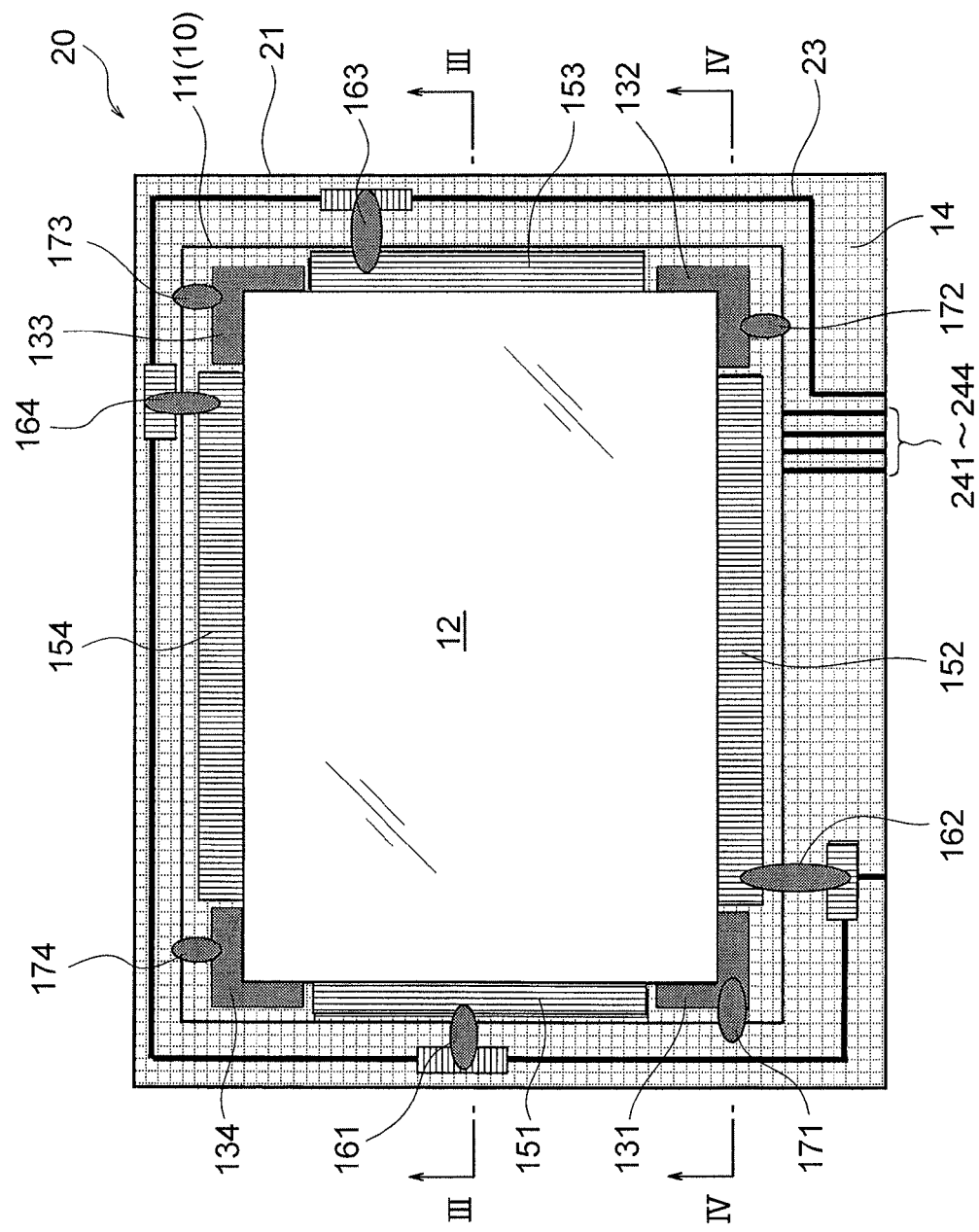
FIG. 2 is a plan view showing the touch panel and the display device according to the first exemplary embodiment.
Figure 3:
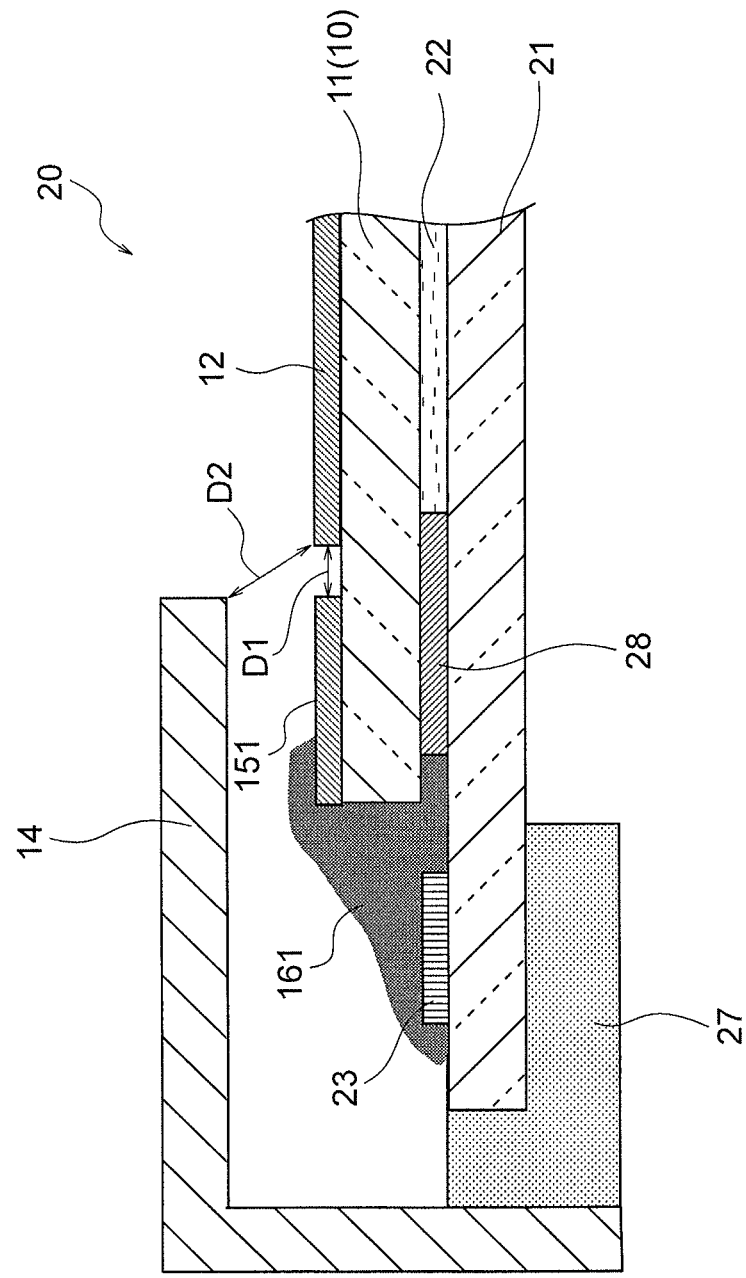
FIG. 3 is a sectional view showing a part of a section taken along a line III-III of FIG. 2.

FIG. 1 is a fragmented perspective view showing a touch panel and a display device according to a first exemplary embodiment. FIG. 2 is a plan view showing the touch panel and the display device according to the first exemplary embodiment. FIG. 3 is a sectional view showing a part of a section taken along a line III-III of FIG. 2. FIG. 4 is a sectional view showing a part of a section taken along a line IV-IV of FIG. 2. Hereinafter, explanations will be provided by referring to those drawings.

A touch panel 10 according to the first exemplary embodiment includes: a CF (color filter) substrate 11 as a substrate constituting the touch panel; a detection region 12 formed in the center of the CF substrate 11 for generating detection signals according to a contact position of a conductor; a plurality of detection electrodes 131 to 134 formed on the fringe side of the CF substrate 11, which output detection signals generated in the detection region 12; a conductive frame 14 which covers above the outer side of the detection region 12 and above the detection electrodes 131 to 134; and shield electrodes 151 to 154 formed on the outer side of the detection region 12 on the CF substrate 11 and between each of the plurality of detection electrodes 131 to 134, to which shield signals for shielding the electric influence for the detection region 12 and the detection electrodes 131 to 134 are supplied. Further, as shown in FIG. 3, distance D1 between the shield electrodes 151 to 154 and the detection region 12 is shorter than distance D2 between the conductive frame 14 and the detection region 12.

A display device 20 according to the first exemplary embodiment is a liquid crystal display device which includes: the CF substrate 20 on which a color filter is formed; a TFT substrate 21 on which TFTs (Thin Film Transistors) are formed; and a liquid crystal layer 22 sandwiched between the CF substrate 11 and the TFT substrate 21. The CF substrate 11 corresponds to the touch panel 10.

Next, the structures of the touch panel 10 and the display device 20 according to the first exemplary embodiment will be described in more details.

The color filter (not shown) is formed on the back surface of the CF substrate 11 in FIG. 1, and it is a typical one that is constituted with three kinds of colors such as RGB (Red, Green, and Blue), for example. The TFT (not shown) is a typical one formed for each pixel in a matrix form on the top surface of the TFT substrate 21 in FIG. 1.

Formed on the TFT substrate 21 are: a shield signal wiring 23 which supplies shield signals to the shield electrodes 151 to 154; and detection signal wirings 241 to 244 which take out detection signals from the detection electrodes 131 to 134. The shield signal wiring 23 is electrically connected to the shield electrodes 151 to 154 by conductive materials 161 to 164 provided between the TFT substrate 21 and the CF substrate 11. The detection signal wirings 241 to 244 are electrically connected to the detection electrodes 131 to 134 by conductive materials 171 to 174 provided between the TFT substrate 21 and the CF substrate 11. Further, the TFT substrate 21 includes an outside connection terminal 25, a driver IC 26, and the like formed thereof, and it is fixed to a resin frame 27.

In FIG. 1, each of the shield electrodes 151 to 154 and the outside connection terminal 25 is shown with a vertical line pattern. As shown in FIG. 1, the detection signal wirings 241 to 244 and the detection electrodes 131 to 134 are connected on a one-on-one basis by the conductive materials 171 to 174. However, the relations thereof are simplified and not illustrated in FIG. 2. Further, the outside connection terminal 25, the driver IC 26, the resin frame 27, and the like shown in FIG. 1 are simplified and not illustrated in FIG. 2. The conductive frame 14 is illustrated with a crosswise grating pattern in FIG. 2. However, regarding the part where the conductive frame 14 overlaps with another structural element, another structural element is shown preferentially. In FIG. 3 and FIG. 4, a seal member 28 shields the liquid crystal layer 22 in a hermetically sealed space together with the CF substrate 11 and the TFT substrate 21.

The detection region 12 is formed with a transparent conductive film such as ITO (Indium Tin Oxide), for example, on the CF substrate 11, and the detection electrodes 131 to 134 electrically connected to the detection region 12 are formed in the periphery of the detection region 12. In the first exemplary embodiment, the CF substrate 11 is in a square shape (quadrilateral shape), and the detection region 12 is in a square shape that is smaller than the CF substrate 11. The detection electrodes 131 to 134 are formed with a conductive material such as silver paste, and output the detection signal by a touch (i.e., a contact made by a conductor such as a finger, a pen, or the like) made on the detection region 12 from the outside connection terminal 25 via the detection signal wirings 241 to 244.

The conductive film 14 is provided by surrounding the outer periphery of the detection region 12 in the periphery of the detection electrodes 131 to 134 and the detection region 12 on the CF substrate 11. In the first exemplary embodiment, the conductive film 14 is provided above the periphery of the detection region 12. The conductive frame 14 protects the end part of the CF substrate 11 and the wirings on the TFT substrate 21, and it is also connected to a ground potential (GND) for shielding the electromagnetic noise intruded from the outer side of the display device 20 to the display signals and the detection signals. The resin frame 27 is provided for fixing the conductive frame 14 and the display device 20.

The shield electrodes 151 to 154 are disposed at one or more positions which are on the same plane as that of the detection region 12, between each of the detection electrodes 131 to 134 in the periphery of the detection region 12, and at the positions electrically isolated from the detection electrodes 131 to 134 and the detection region 12. In the first exemplary embodiment, one each of the four shield electrodes 151 to 154 in total are provided between each of the detection electrodes 131 to 134 provided at the four corners of the detection region 12, respectively. Suitable positions for disposing the shield electrodes 151 to 154 are the positions on the same plane as that of the detection region 12 and the detection electrodes 131 to 134, between the detection electrodes 131 to 134 in the periphery of the detection region 12, and the part where deformation of the conductive frame 14 is large.

The shield signal wiring 23 is provided on the TFT substrate 21, and connected to the shield electrodes 151 to 154 by the conductive materials 161 to 164. The shield signal wiring 23 inputs the shield signal from the outside connection terminal 25, and applies it to the shield electrodes 151 to 154.

Figure 5A:
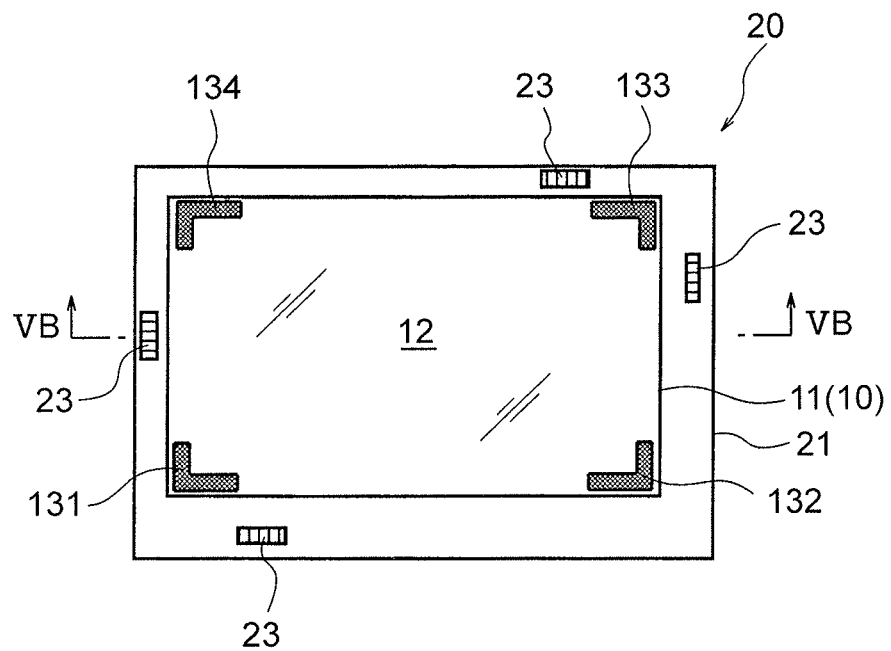
Figure 5B:
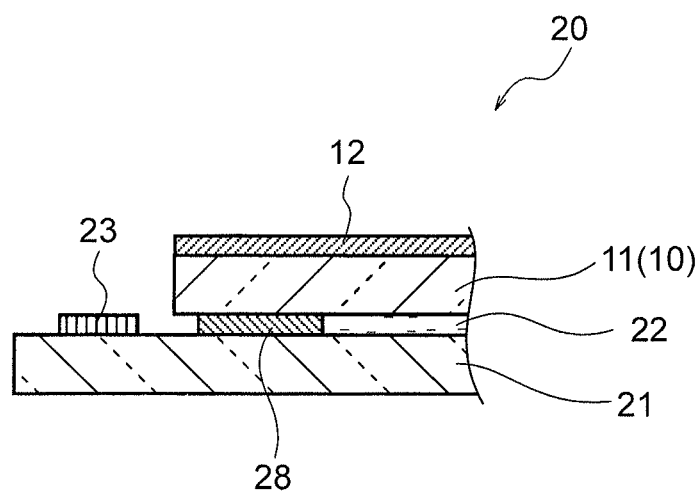
Figure 6A:
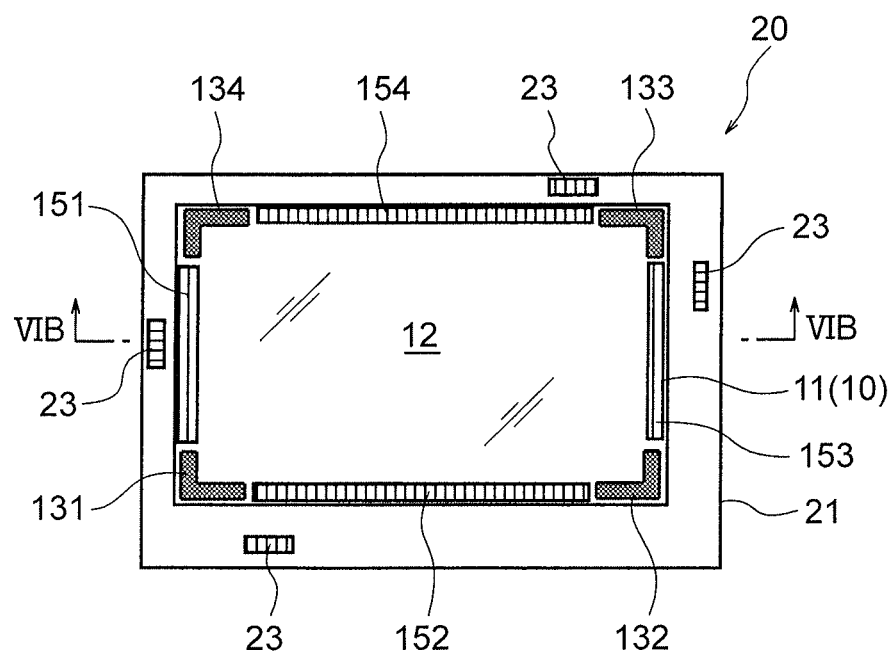
Figure 6B:
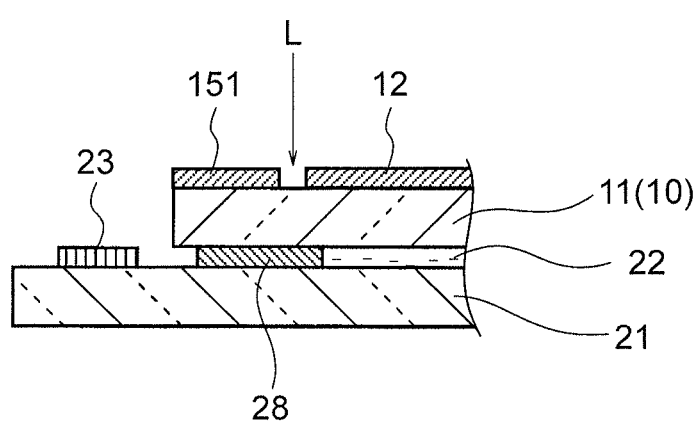
Figure 7A:
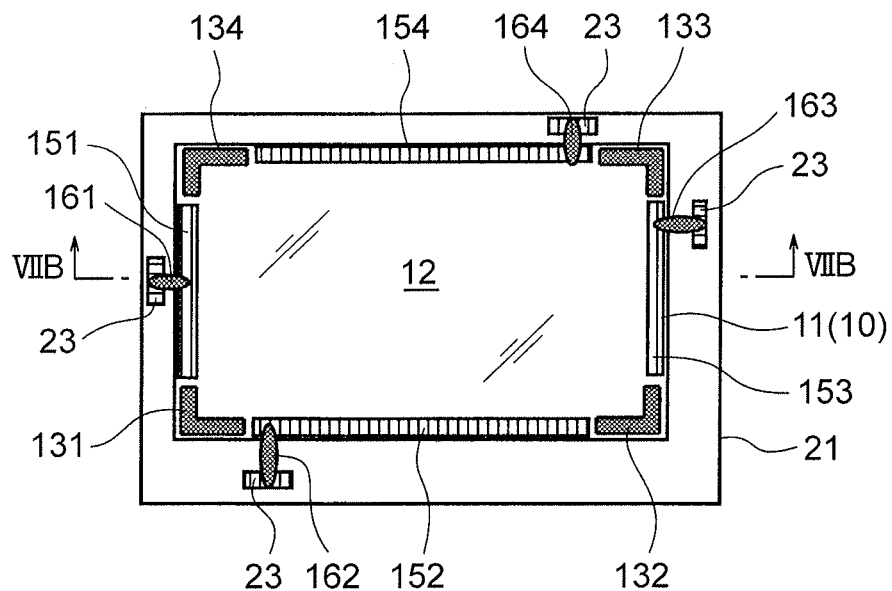
Figure 7B:
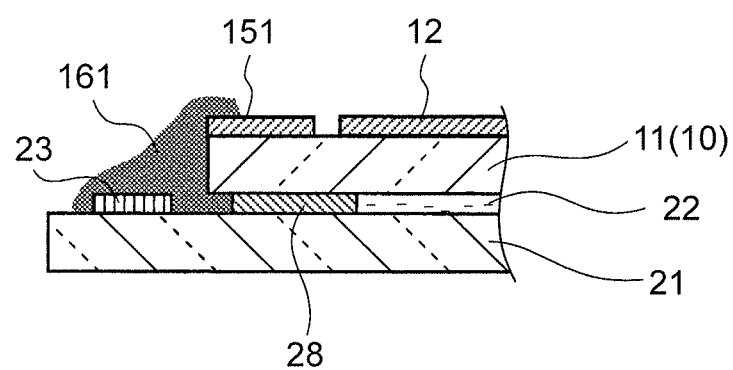

FIG. 5 to FIG. 7 show the manufacturing method of the display device according to the first exemplary embodiment. FIG. 5A is a plan view, and FIG. 5B is a sectional view showing a part of a section taken along a line VB-VB of FIG. 5A. FIG. 6A is a plan view, and FIG. 6B is a sectional view showing a part of a section taken along a line VIB-VIB of FIG. 6A. FIG. 7A is a plan view, and FIG. 7B is a sectional view showing a part of a section taken along a line VIIB-VIIB of FIG. 7A. Hereinafter, the manufacturing method of the display device 20 will be described by referring to those drawings.

FIG. 5 to FIG. 7 show the manufacturing method of a case where the shield signal wiring 23 is provided on the TFT substrate 21 and the shield electrodes 151 to 154 are patterned by laser light L, and the steps are executed in this order. First, as shown in FIG. 5A and FIG. 5B, a transparent conductive film to be the detection region 12 and the detection electrodes 131 to 134 are formed on the surface of the CF substrate 11.

Subsequently, as shown in FIG. 6A and FIG. 6B, the band-shaped shield electrodes 151 to 154 are formed between each of the detection electrodes 131 to 134 through patterning the transparent conductive film on the surface of the CF substrate 11 by using the laser light L in such a manner that the detection region 12 and the detection electrodes 131 to 134 are electrically isolated. When $CO_2$ laser, for example, is used at the time of performing patterning by the laser light L, the laser light does not transmit through the glass used for the CF substrate 11. Thus, it is possible to perform processing without damaging the wirings and the seal member 28 formed between the CF substrate 11 and the TFT substrate 21. At that time, the distance between the shield electrodes 151 to 154 and the detection region 12 can be formed as about 0.05 mm by the laser light L.

Subsequently, as shown in FIG. 7A and FIG. 7B, the conductive materials 161 to 164 such as silver paste are applied by a dispenser or the like for electrically connecting the shield electrodes 151 to 154 and the shield signal wiring 23. The conductive material such as the silver paste or the like is cured by heat calcination or ultraviolet irradiation. Thereafter, the display device 20 is completed through mounting a polarization plate as well as a backlight, not shown, as well as the driver IC 26, the conductive frame 14, and the like shown in FIG. 1. As a method for forming the shield electrodes 151 to 154, the transparent conductive film may be patterned by using a method such as photolithography, screen printing, or the like instead of using the laser light L.

FIG. 8 shows waveform charts showing shield signals used in the touch panel and the display device according to the first exemplary embodiment. Hereinafter, explanations will be provided by mainly referring to FIG. 8.

Figure 8A:

FIG. 8 shows specific examples of the shield signals supplied to the shield electrodes 151 to 154 shown in FIG. 1 and FIG. 2. In each chart of FIG. 8, the lateral axis is the time, and the longitudinal axis is the voltage. FIG. 8A is a reference signal of the detection signal. The reference signal of the detection signal is an alternate current (sine wave) of a case where there is no touch, i.e., in a no-detection signal state. FIG. 8B to FIG. 8G are shield signals, in which FIG. 8C is a square wave, FIG. 8D is a triangle wave, FIG. 8E is a sawtooth wave, FIG. 8 F is a direct current, and FIG. 8G is a ground potential GND. The shield signals of FIG. 8C to FIG. 8E are synchronized with the reference signal of the detection signal shown in FIG. 8A. Thus, there is such an advantage that the potential difference between the shield electrodes 151 to 154 and the detection region 12 shown in FIG. 1 and FIG. 2 becomes small. The shield signals of FIG. 8 F and FIG. 8G are the direct current voltages, so that there is such an advantage that the structure can be simplified. As described above, the shield signals are constituted with the ground potentials GND, the direct current signals, or the alternate current signals, and shield the electric influence for the detection signals. For example, the ground potential GND connected to the display device 20 and the COM signals used for displaying on the display device 20 are used for the shield signals.

Figure 9:
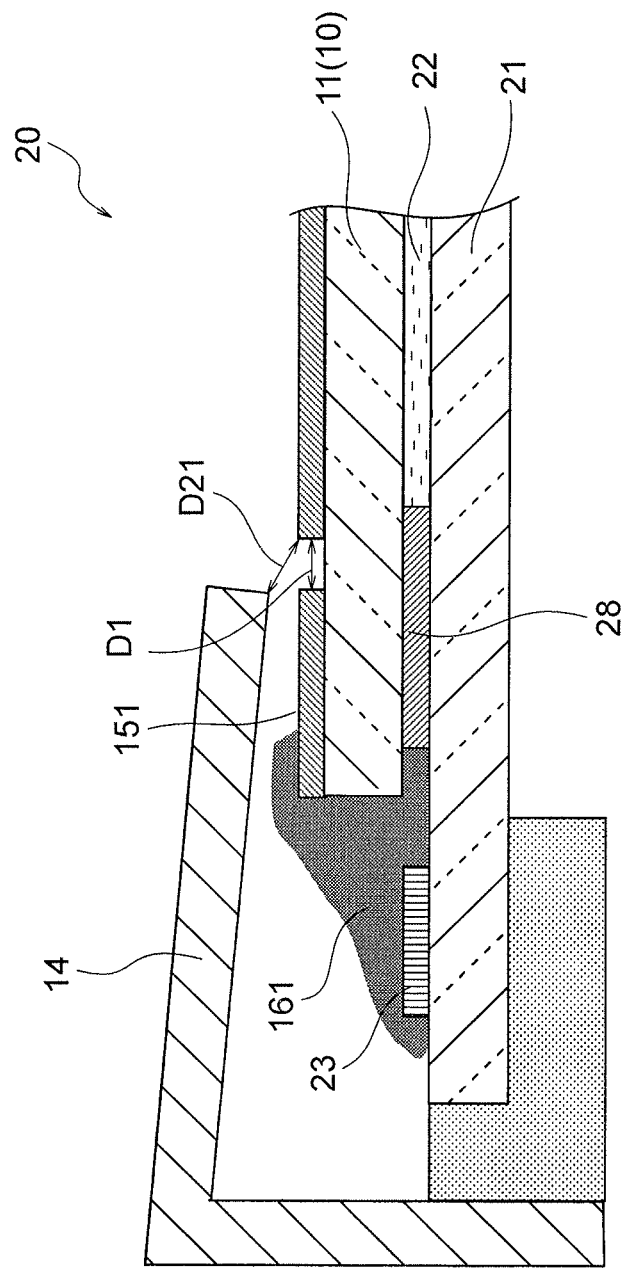
FIG. 9 is a sectional view showing deformation of a conductive frame in the touch panel and the display device according to the first exemplary embodiment.
Figure 10:
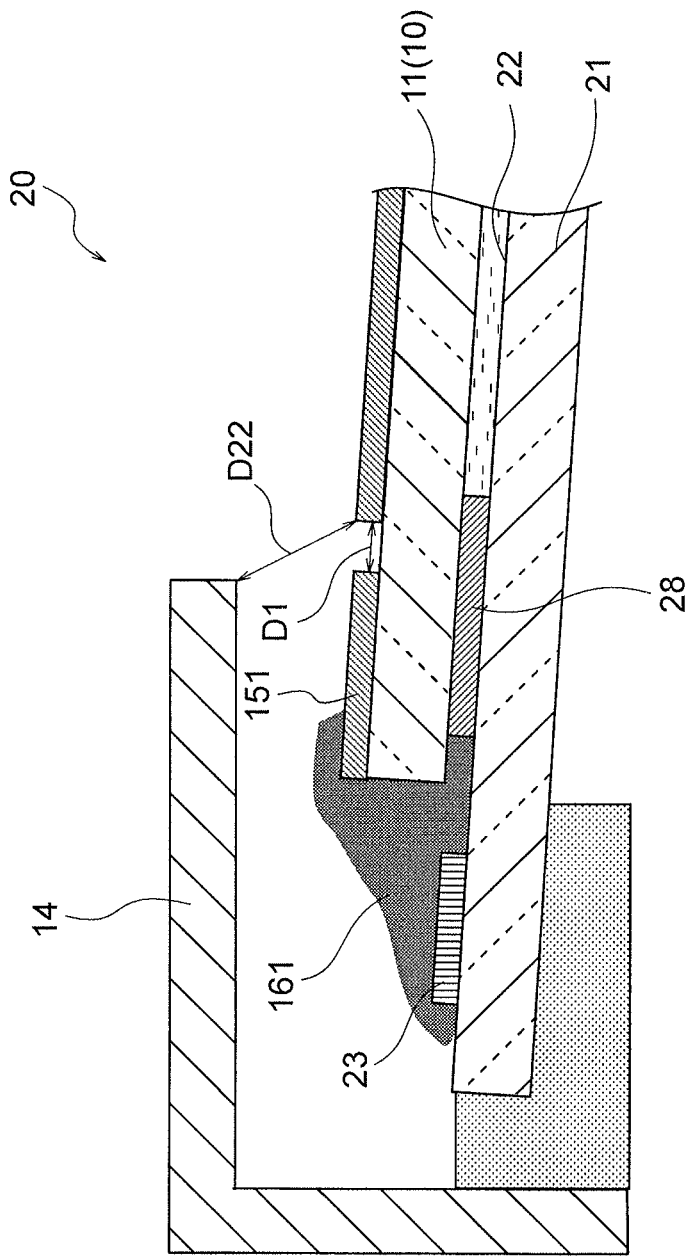
FIG. 10 is a sectional view showing deformation of the conductive frame in the touch panel and the display device according to the first exemplary embodiment.

FIG. 9 and FIG. 10 are sectional views showing deformation of the conductive frame in the touch panel and the display device according to the first exemplary embodiment. Hereinafter, explanations will be provided by referring to FIG. 3, FIG. 9, and FIG. 10.

FIG. 9 and FIG. 10 show the same sectional view as that of FIG. 3. That is, FIG. 3 shows the case where there is no deformation of the conductive frame 14. FIG. 9 is the case where a finger or the like presses the conductive frame 14 at the time of making a touch so that the conductive frame 14 is deformed to become close to the CF substrate 11. FIG. 10 is the case where a finger or the like presses the CF substrate 11 at the time of making a touch so that the conductive frame 14 is deformed to leave away from the CF substrate 11.

The distance D2 between the conductive frame 14 and the detection region 12 shown in FIG. 3 changes to the distance D21 in the case of FIG. 9, and changes to the distance D22 in the case of FIG. 10. When the distance D2 between the conductive frame 14 and the detection region 12 changes within the range of D21<D2<D22, the capacitance C2 (not shown) between the conductive frame 14 and the detection region 12 changes as well. This becomes the noise of the detection signal.

In the first exemplary embodiment, as shown in FIG. 3, the distance D1 between the shield electrodes 151 to 154 and the detection region 12 is shorter than the distance D2 between the conductive frame 14 and the detection region 12. This relation also applies for the distance D21 of the case of FIG. 9 and the distance D22 of the case of FIG. 10 That is, the relation D1<D21<D2<D22 applies. Thus, the capacitance C1 (not shown) between the shield electrodes 151 to 154 and the detection region 12 is larger than the capacitance C2 between the conductive frame 14 and the detection region 12. Moreover, the distance D1 between the shield electrodes 151 to 154 and the detection region 12 is always constant regardless of the deformation of the conductive frame 14. Therefore, the detection signal is largely affected by the always constant and large value capacitance C1, so that the noise generated due to the fluctuation of the capacitance C2 becomes small relatively.

Figure 11:
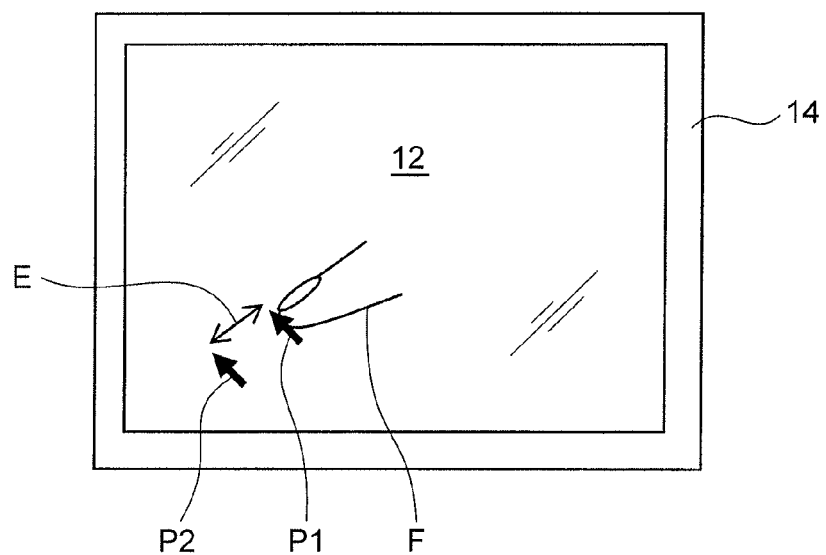
FIG. 11 is a plan view of the touch panel for describing the effect of the touch panel and the display device according to the first exemplary embodiment.
Figure 12:
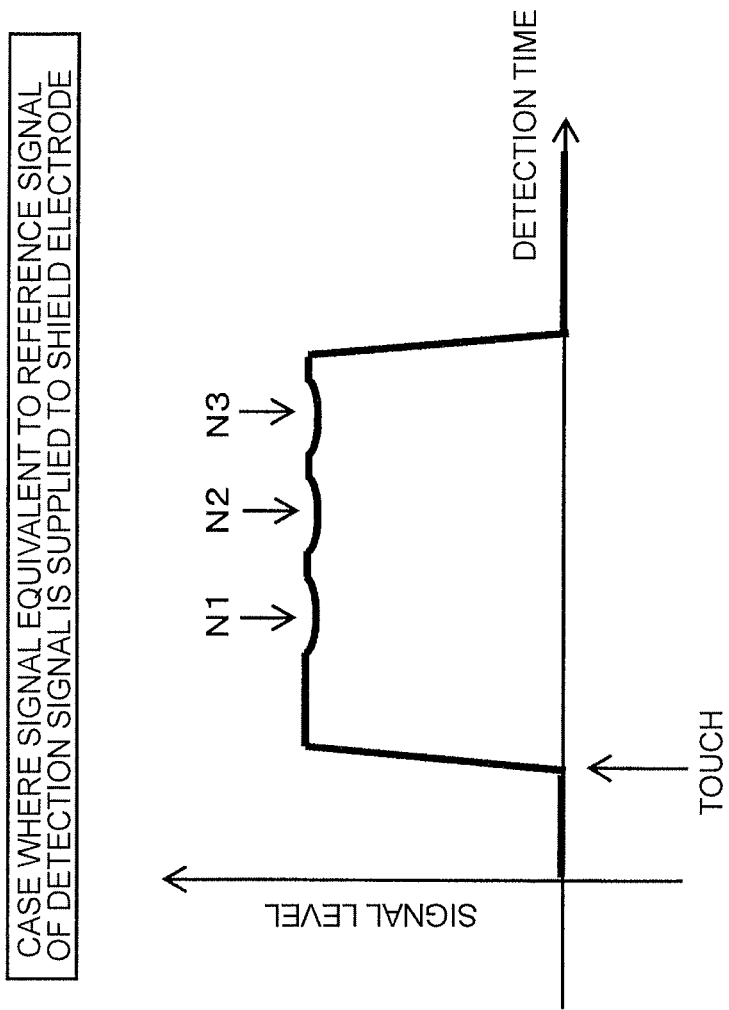
FIG. 12 is a waveform chart of a detection signal for describing the effect of the touch panel and the display device according to the first exemplary embodiment.
Figure 13:
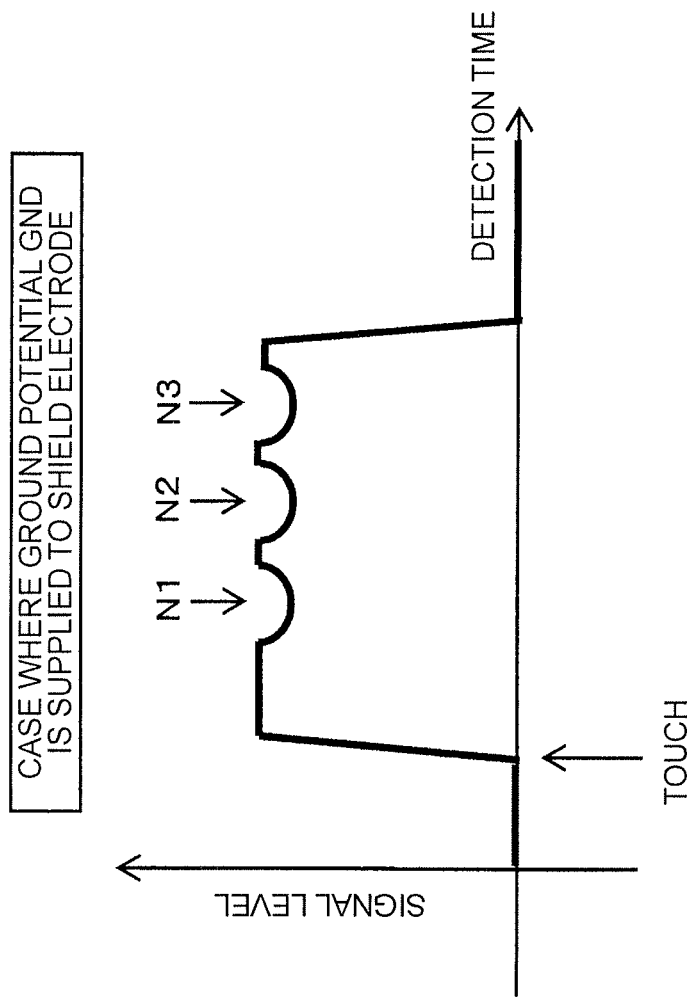
FIG. 13 is a waveform chart of a detection signal for describing the effect of the touch panel and the display device according to the first exemplary embodiment.
Figure 14:
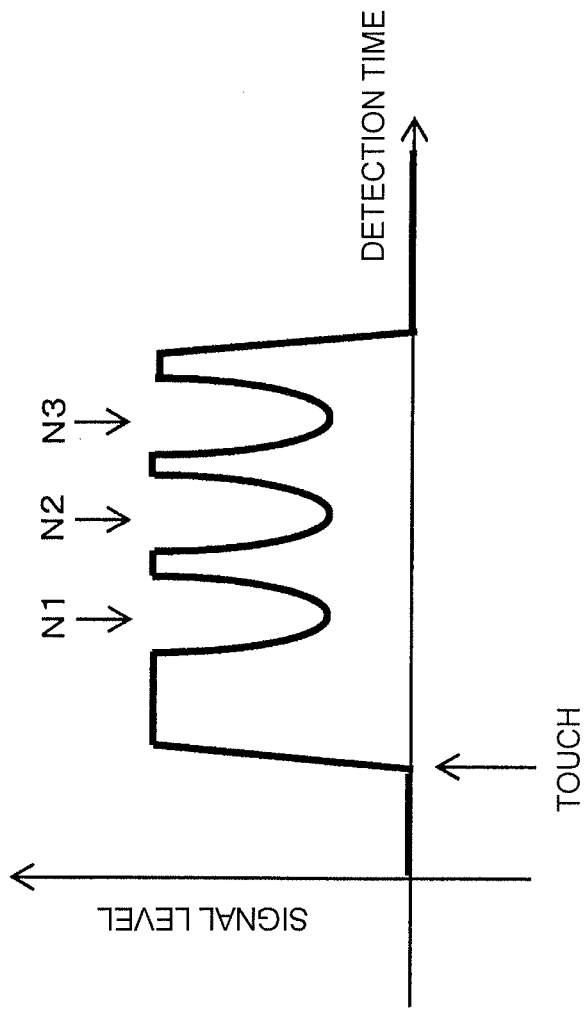
FIG. 14 is a waveform chart of a detection signal for describing the effect of the touch panel and the display device according to the first exemplary embodiment.

FIG. 11 is a plan view of the touch panel for describing the effect of the touch panel and the display device according to the first exemplary embodiment. FIG. 12 to FIG. 14 are waveform charts of the detection signals for describing the effect of the touch panel and the display device according to the first exemplary embodiment. The experimental effects of the touch panel and the display device according to the first exemplary embodiment will be described hereinafter by referring to FIG. 1 to FIG. 3 and FIG. 8 to FIG. 14.

As written below, the touch recognition results under conditions B1, B2, and C for condition A were verified.

Condition A: The distance between the conductive frame 14 and the detection region 12 is changed from 5 mm to 0.05 mm by deforming the conductive frame 14.

Condition B1: The shield electrodes 151 to 154 are provided. The distance between the shield electrodes 151 to 154 and the detection region 12 is fixed as 0.05 mm. One of the signals (one selected from FIG. 8 B to FIG. 8E) equivalent to the reference signal of the detection signal is supplied to the shield electrodes 151 to 154.

Condition B2: The shield electrodes 151 to 154 are provided. The distance between the shield electrodes 151 to 154 and the detection region 12 is fixed as 0.05 mm. The ground potential GND (FIG. 8G) is supplied to the shield electrodes 151 to 154.

Condition C: The shield electrodes 151 to 154 are not provided.

In FIG. 11, when the conductive frame 14 is not deformed, a pointer P1 is shown at an accurate position when the detection region 12 is touched by a finger F. In the meantime, when the conductive frame 14 is deformed, a pointer P2 is shown at a position that is shifted by an amount of position shift E when the detection region 12 is touched by the finger F. When the position shift E is within an allowable range, it is judged as "insignificant misrecognition". When the position shift E exceeds the allowable range, it is judged as "misrecognition".

The touch recognition results (noise reduction effects) acquired by combinations of the condition A and one of the conditions B1, B2, and C are as follows. The symbols showing the touch recognition results are defined as ○: fine recognition, △: insignificant misrecognition, and x: misrecognition.

TABLE 1

| A | B1 | B2 | C |
|---|---|---|---|
| 5 mm | ○ | ○ | ○ |
| 3 mm | ○ | ○ | ○ |
| 1 mm | ○ | ○ | Δ |
| 0.5 mm | ○ | ○ | X |
| 0.05 mm | ○ | Δ | X |

Detection signals when touches are recognized under the conditions B1, B2, and C for a given condition A are shown in FIG. 12 to FIG. 14, respectively. In FIG. 12 to FIG. 14, the lateral axis is the detection time after a touch, and the longitudinal axis is the signal level of the detection signal. FIG. 12 shows the detection signal under the condition B1, FIG. 13 shows the detection signal under the condition B2, and FIG. 14 shows the detection signal under the condition C. The noises N1, N2, and N3 generated due to the deformation of the conductive frame 14 become larger in order of the condition B1, the condition B2, and the condition C.

As can be seen from the experimental results described above, the touch panel and the display device of the first exemplary embodiment provide the following effects.

When the conductive frame 14 is deformed by the weight added at the time of the touch, the distance D2 between the conductive frame 14 and the detection region 12 is changed. Accordingly, the capacitance C2 between the conductive frame 14 and the detection region 12 is changed, and it becomes the noise for the detection signal. In the first exemplary embodiment, the distance D1 between the shield electrodes 151 to 154 and the detection region 12 is set to be shorter than the distance D2 between the conductive frame 14 and the detection region 12. Thus, the distance D1 between the shield electrodes 151 to 154 and the detection region 12 can be kept constant even when the distance D2 between the conductive frame 14 and the detection region 12 is changed, so that the noise intruded to the detection signal caused by the deformation of the conductive frame 14 can be suppressed.

The shield signal may be the ground potential GND. However, when the shield signal is the signal of the equivalent frequency and voltage level as those of the reference signal of the detection signal, the shield effect can be expected further. Therefore, misrecognition can be decreased.

Through disposing the shield electrodes 151 to 154 in the periphery of the detection region 12, it is possible to suppress intrusion of the electromagnetic noise generated inside the display device 20 into the detection region 12 from the end part and the like of the CF substrate 11.

Through providing the shield electrodes 151 to 154 in the periphery of the detection region 12 and between each of the detection electrodes 131 to 134, it becomes unnecessary to increase the size of the external shape of the display device 20.

The physical distance D1 between the shield electrodes 151 to 154 and the detection region 12 for electrically isolating the shield electrodes 151 to 154 and the detection region 12 is set to be shorter than the distance D2 between the conductive frame 14 and the detection region 12. The distance D1 between the shield electrodes 151 to 154 and the detection region 12 is desirable to be about $\frac{1}{10}$ of the distance D2 between the conductive frame 14 and the detection region 12 (Table 1). Provided that the relation regarding the distances D1 and D2 is satisfied, the conductive frame 14 provided above the periphery of the detection region 12 can be brought closer to the detection region 12 as the shield electrodes 151 to 154 are brought closer to the detection region 12. Thus, it is also expected to achieve the effect of thinning the thickness of the display device 20 that includes the touch panel 10.

Further, through disposing the shield electrodes 151 to 154 on the same plane as that of the detection region 12 and the detection electrodes 131 to 134 and in the periphery of the detection region 12 neighboring to the detection electrodes 131 to 137, it is also possible to expect the effect of reducing the noise intruded to the detection region 12 from the spaces between each of the detection electrodes 131 to 137 by transmitting on the surface of the CF substrate 11.

Further, through disposing the shield electrodes 151 to 154 on the plane same as that of the detection region 12 and the detection electrodes 131 to 134, the pattern of the shield electrodes 151 to 154 can be formed simultaneously with the detection region 12 or the detection electrodes 131 to 134. Thus, the effect of reducing the number of steps for forming the shield electrodes 151 to 154 can also be expected.

When the shield electrodes 151 to 154 are formed with a transparent conductive film like the detection region 12, following effects can be achieved. The visibility is not deteriorated even when the shield electrodes 151 to 154 are disposed in the vicinity of the display region of the display device 20. Thus, the outer periphery part of the TFT substrate 21 where the shield electrodes 151 to 154 and the detection signal wirings 241 to 244 are disposed can be narrowed, so that it is effective for narrowing the frame.

When the shield signal wiring 23 is provided in the outer periphery of the detection signal wirings 241 to 244, the shield effect for the detection signal wirings 241 to 244 can also be expected.

Next, Modification Examples 1 to 4 of the touch sensor and the display device according to the first exemplary embodiment will be described by referring to FIG. 15 to FIG. 20. For making it easy to understand, same reference numerals as those of the structural elements of FIG. 2 are applied to the structural elements of FIG. 15 to FIG. 20 as long as the functions thereof are the same even if the shapes are different from those of the structural elements of FIG. 2.

Figure 15:
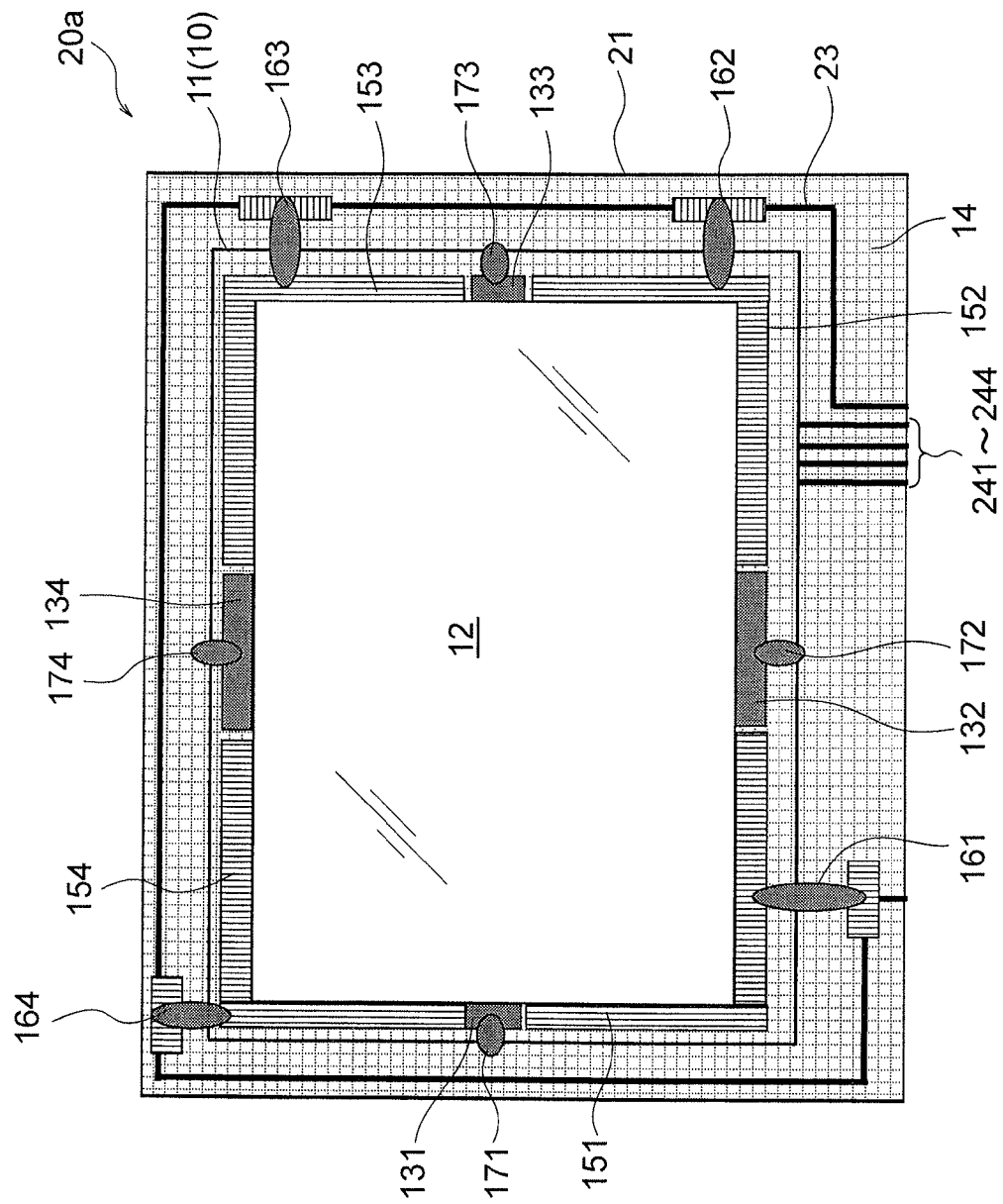
FIG. 15 is a plan view showing Modification Example 1 of the touch sensor and the display device according to the first exemplary embodiment.

FIG. 15 shows Modification Example 1. In a display device 20a of Modification Example 1, positions of the detection electrodes 131 to 134 are different from those of the display device 20 of the first exemplary embodiment. That is, in the display device 20a, the detection electrodes 131 to 134 are provided not in the four corners but in the middle of each side of the rectangular detection region 12.

Figure 16:
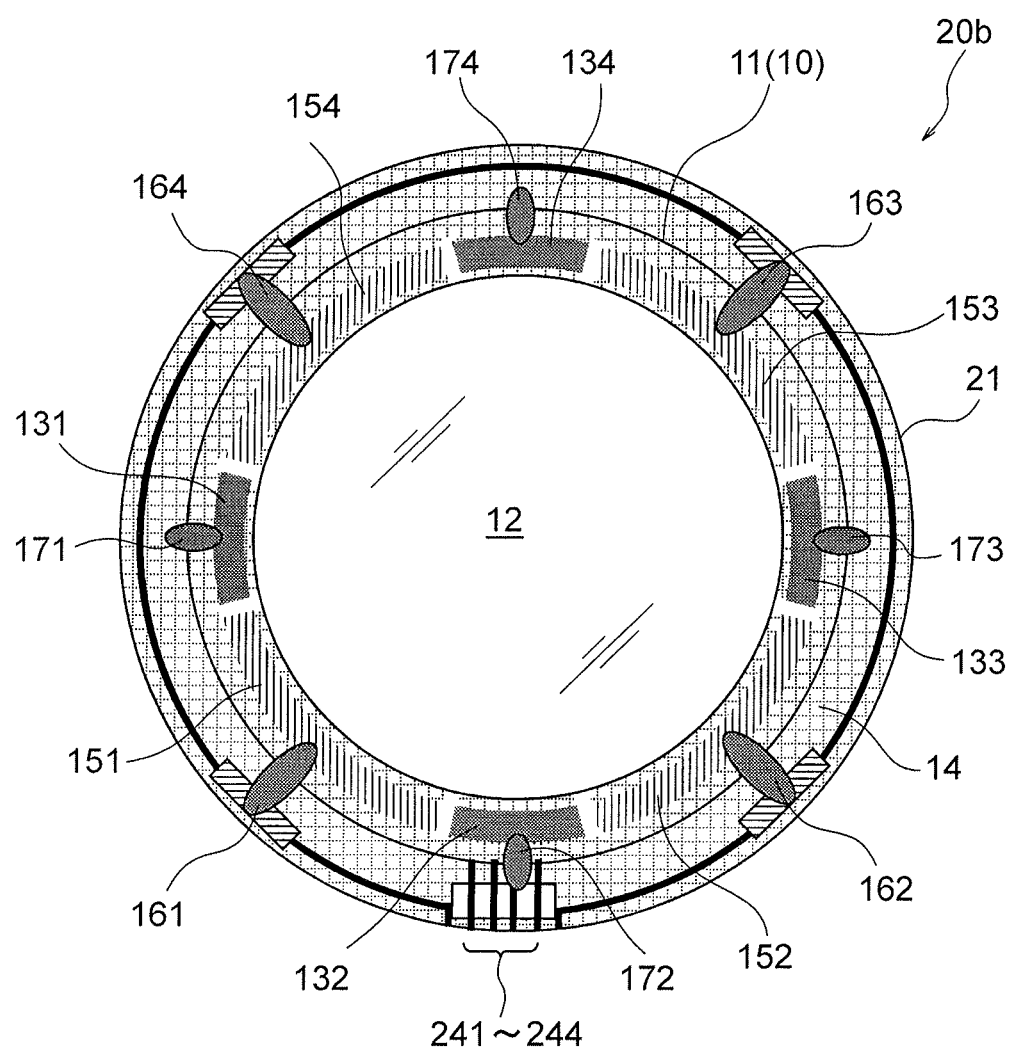
FIG. 16 is a plan view showing Modification Example 2 of the touch sensor and the display device according to the first exemplary embodiment.

FIG. 16 shows Modification Example 2. In a display device 20b of Modification Example 2, the shape of the detection region 12 is different from that of the display device 20 of the first exemplary embodiment. That is, in the display device 20b, the detection region 12 is not in a rectangular form but in a circular form. In a case where the detection region 12 is formed in a polygonal shape or a heteromorphic shape, a plurality of detection electrodes 131, — can be provided at arbitrary points.

Figure 17:
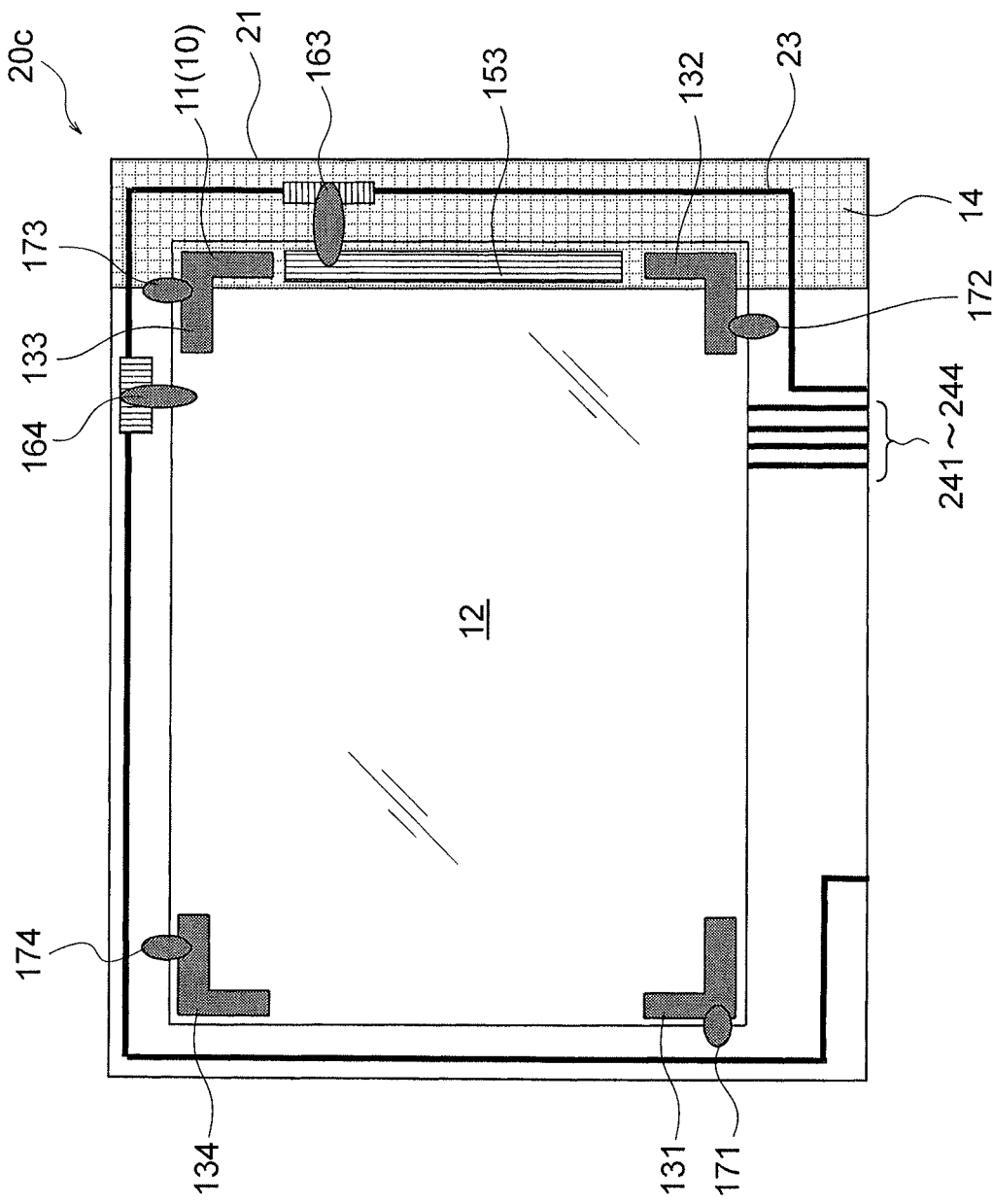
FIG. 17 is a plan view showing Modification Example 3 of the touch sensor and the display device according to the first exemplary embodiment.

FIG. 17 shows Modification Example 3. In a display device 20c of Modification Example 3, the shape and size of the conductive frame 14 are different from those of the display device 20 of the first exemplary embodiment. That is, in the display device 20c, the conductive frame 14 is in the shape and size with which the detection region 12 and the detection electrodes 131 to 134 are covered not entirely but partially. In that case, the shield electrode 153 may be disposed only in the part where the conductive frame 14 is disposed.

Figure 18:
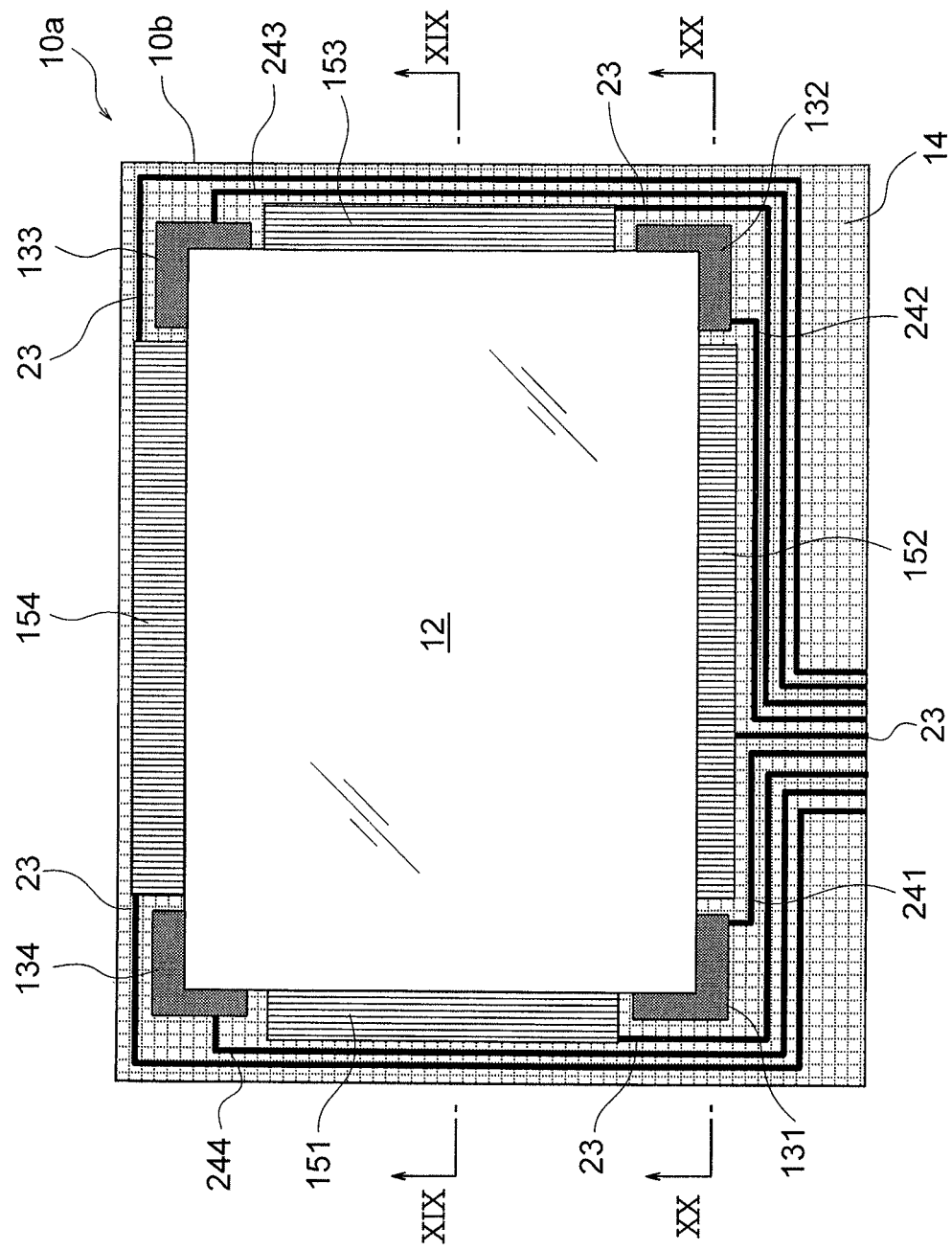
FIG. 18 is a plan view showing Modification Example 4 of the touch sensor according to the first exemplary embodiment.
Figure 19:
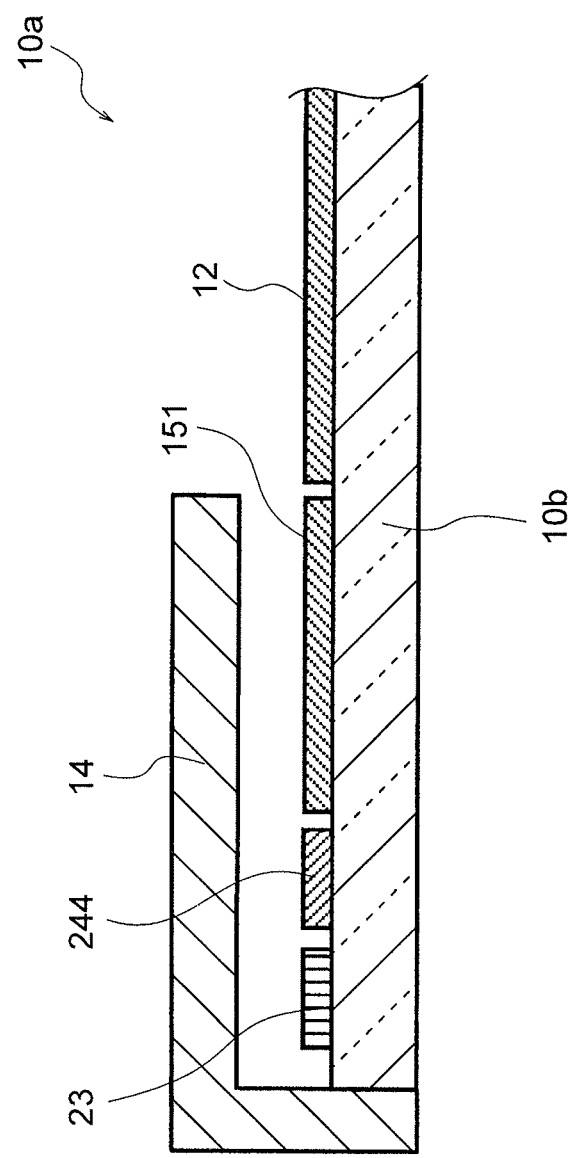
FIG. 19 is a sectional view showing a part of a section taken along a line XIX-XIX of FIG. 18.
Figure 20:
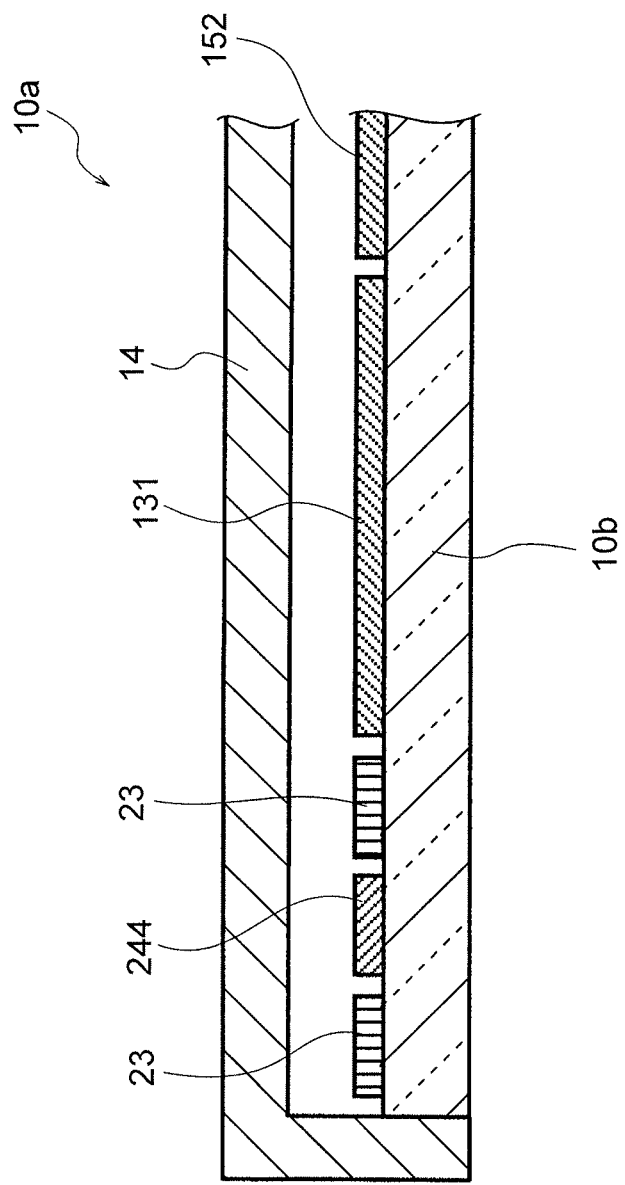
FIG. 20 is a sectional view showing a part of a section taken along a line XX-XX of FIG. 18.

FIG. 18 to FIG. 20 show Modification Example 4. A touch panel 10a of Modification Example 4 is different from the display device 20 of the first exemplary embodiment in respect that it is constituted with a touch panel alone. Thus, in the touch panel 10a, the shield signal wiring 23 and the detection signal wirings 241 to 244 are formed not on the TFT substrate but on a substrate 10b.

Other structures, operations, and effects of Modification Examples 1 to 4 are same as those of the first exemplary embodiment.

As an exemplary advantage according to the invention, the distance from the detection region to the shield electrode is shorter than the distance from the detection region to the conductive frame. Thus, the noise generated due to deformation and the like of the conductive frame is suppressed by the shield electrode and not transmitted to the detection region, so that the noise is not included in the detection signal generated in the detection region. As a result, misrecognition in the touch panel can be suppressed.

Figure 21:
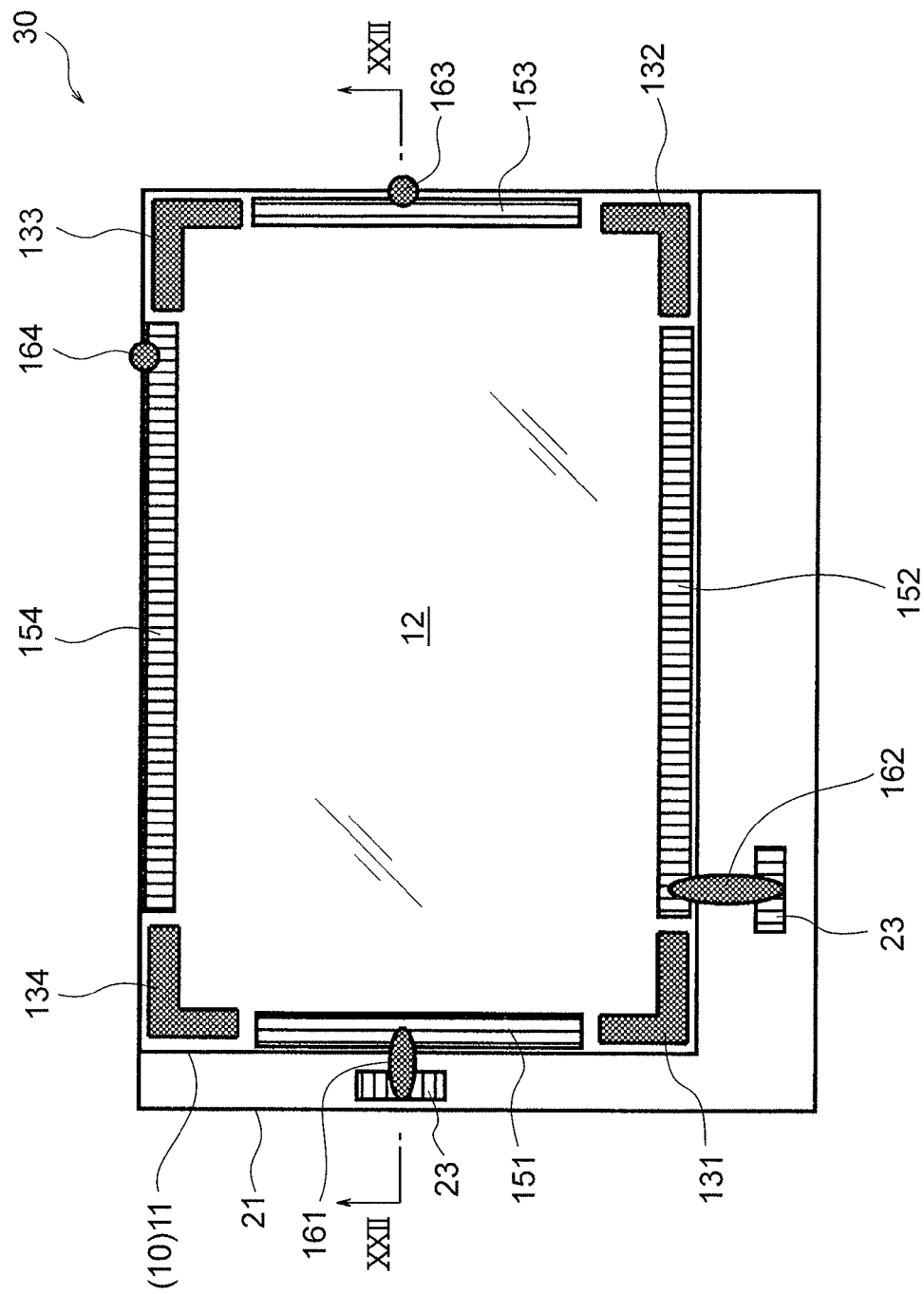
FIG. 21 is a plan view showing a touch panel and a display device according to a second exemplary embodiment.
Figure 22:
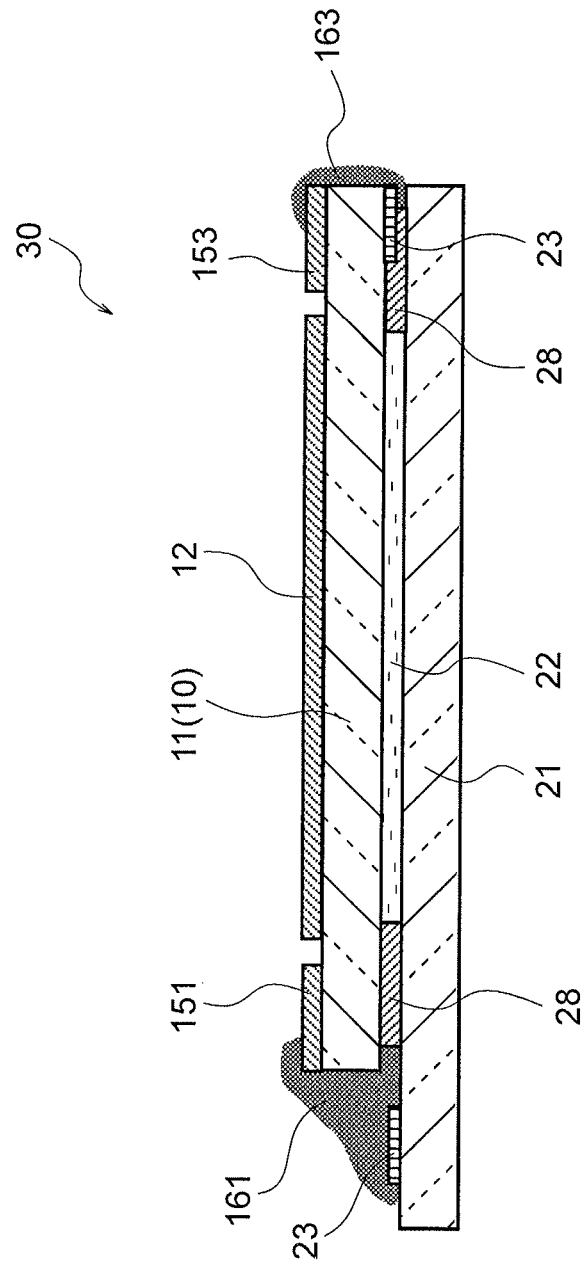
FIG. 22 is a sectional view taken along a line XXII-XXII of FIG. 21.

FIG. 21 is a plan view showing a touch panel and a display device according to a second exemplary embodiment. FIG. 22 is a sectional view taken along a line XXII-XXII of FIG. 21. Hereinafter, explanations will be provided by referring to those drawings. For making it easy to understand, same reference numerals as those of the structural elements of the first exemplary embodiment are applied to the structural elements of the second exemplary embodiment as long as the functions thereof are the same even if the shapes are different from those of the structural elements of the first exemplary embodiment.

Hereinafter, the parts different from those of the first exemplary embodiment will be described in details, and illustrations and explanations of the parts same as those of the first exemplary embodiment such as the conductive frame 14, the conductive materials 171 to 174 as well as a part of the shield signal wiring 23, the detection signal wirings 241 to 244, and the like shown in FIG. 2 will be omitted.

A display device 30 of the second exemplary embodiment is different from the display device 20 of the first exemplary embodiment in respect that there is a part where two side faces are on a same plane since there is no step in the fringe under a state where the CF substrate 11 and the TFT substrate 21 overlap on one another and that shield electrodes 153, 154 are provided in the vicinity of that part. In this case, the shield signal wiring 23 connected to the shield electrodes 153 and 154 can be provided between the TFT substrate 21 and the CF substrate 11 as shown in FIG. 22. Liquid-type fluidity conductive materials 163 and 164 are used for connecting the shield electrodes 153, 154 and the shield signal wiring 23, and those materials are poured between the TFT substrate 21 and the CF substrate 11 by a dispenser or an inkjet device. The shield signal wiring 23 may be provided on the CF substrate 11 side.

With the display device 30 of the second exemplary embodiment, the step between the TFT substrate 21 and the CF substrate 11 becomes unnecessary through providing the shield signal wiring 23 between the TFT substrate 21 and the CF substrate 11. Thus, it is unnecessary to increase the size of the external shape of the touch panel 10. Other structures, operations, and effects of the second exemplary embodiment are same as those of the first exemplary embodiment.

Figure 23:
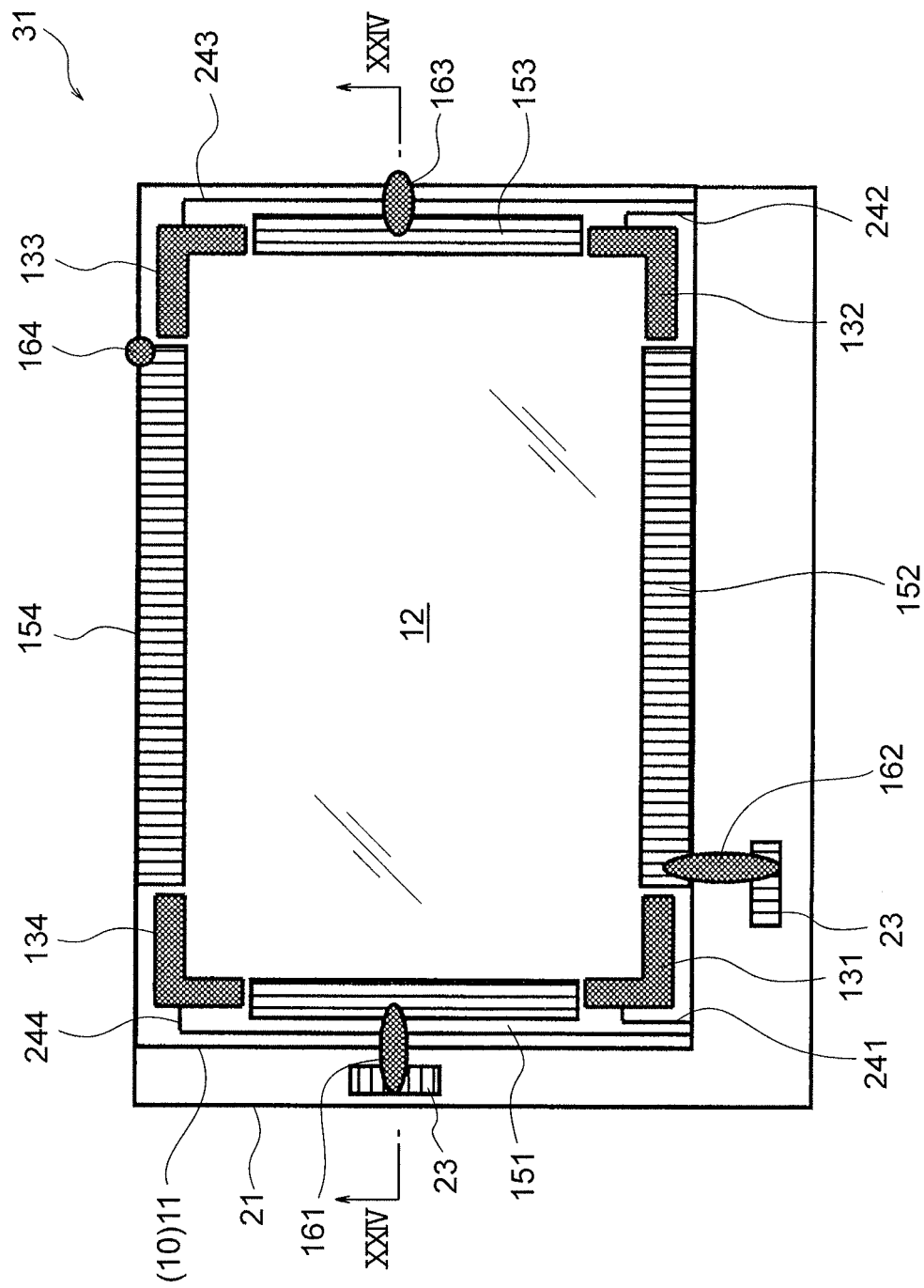
FIG. 23 is a plan view showing a touch panel and a display device according to a third exemplary embodiment.
Figure 24:
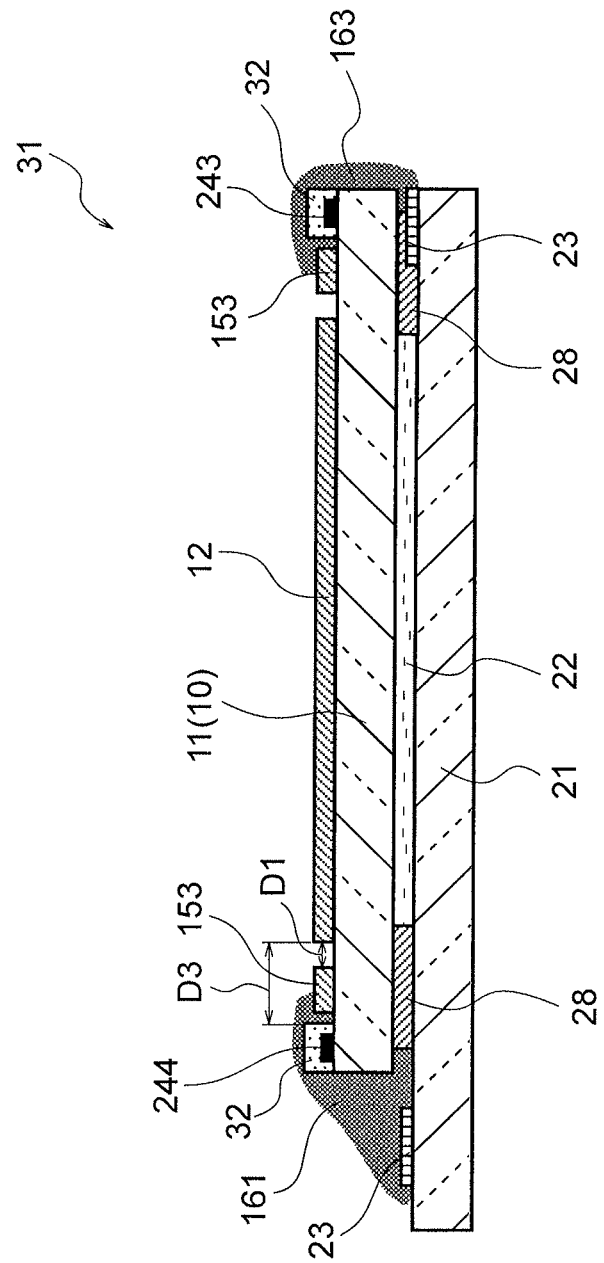
FIG. 24 is a sectional view taken along a line XXIV-XXIV of FIG. 23.
Figure 25:
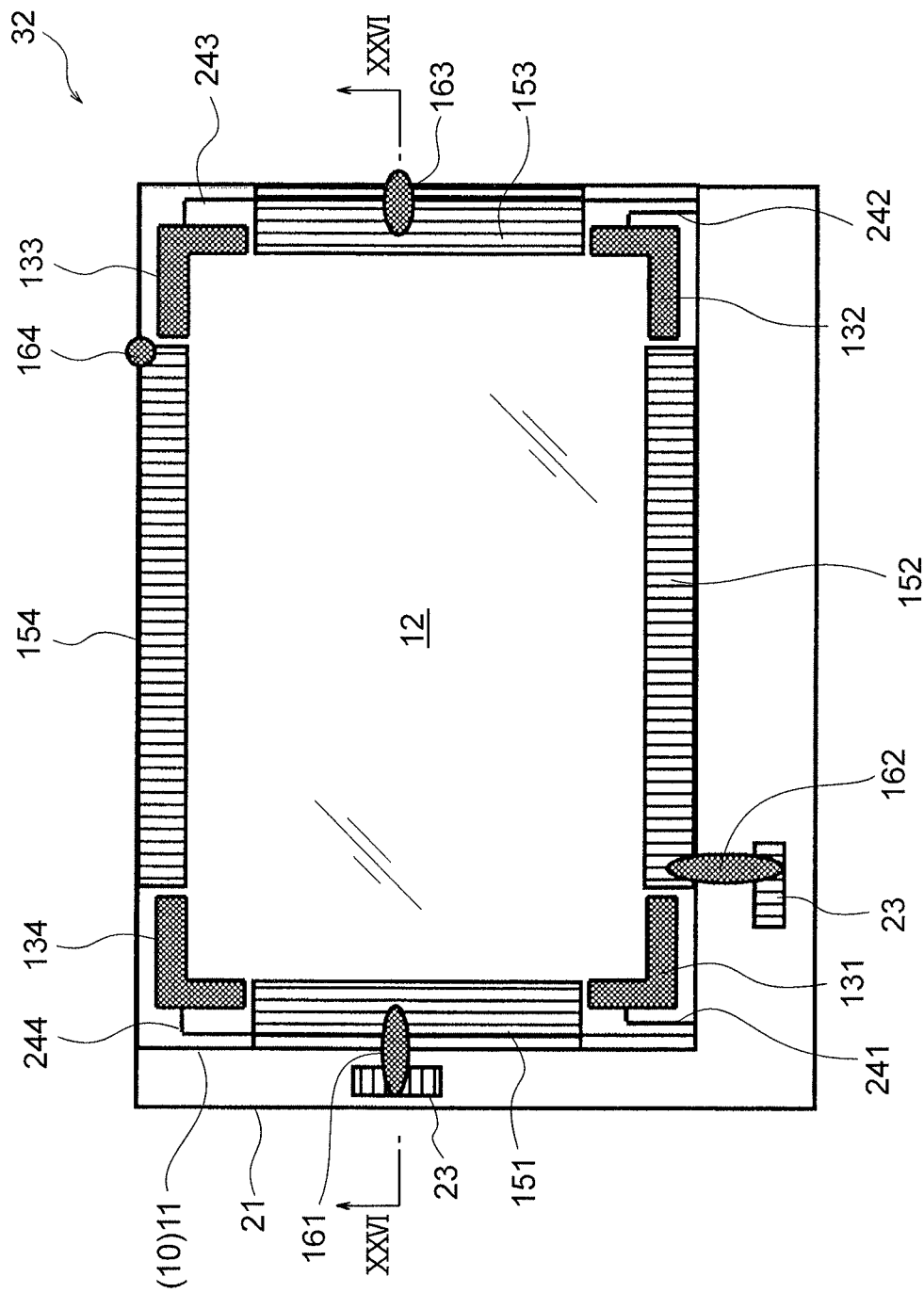
FIG. 25 is a plan view showing Modification Example 1 of the touch sensor and the display device according to the third exemplary embodiment.

FIG. 23 is a plan view showing a touch panel and a display device according to a third exemplary embodiment. FIG. 24 is a sectional view taken along a line XXIV-XXIV of FIG. 23. FIG. 25 is a plan view showing Modification Example 1 of the touch sensor and the display device according to the third exemplary embodiment. FIG. 26 is a sectional view taken along a line XXVI-XXVI of FIG. 25. Hereinafter, explanations will be provided by referring to those drawings. For making it easy to understand, same reference numerals as those of the structural elements of the first exemplary embodiment are applied to the structural elements of the third exemplary embodiment as long as the functions thereof are the same even if the shapes are different from those of the structural elements of the first exemplary embodiment.

Hereinafter, the parts different from those of the first exemplary embodiment will be described in details, and illustrations and explanations of the parts same as those of the first exemplary embodiment such as the conductive frame 14, the conductive materials 171 to 174 as well as a part of the shield signal wiring 23 and the like shown in FIG. 2 will be omitted.

In a case where the detection signal wirings 241 to 244 are provided on the CF substrate 11 in the display device 31 of the third exemplary embodiment, the conductive materials 161 to 164 used for connecting to the shield electrodes 151 to 154 are prevented from being electrically connected to the detection signal wirings 241 to 244 through covering the detection signal wirings 241 to 244 with an insulating material 32 as shown in FIG. 24. Further, the distance D1 between the shield electrodes 151 to 154 and the detection region 12 is shorter than distance D3 between the detection signal wirings 241 to 244 and the detection region 12.

Further, in the display device 33 of Modification Example 1, as shown in FIG. 26, the detection signal wirings 241 to 244 and the shield electrodes 151 to 154 can be formed as a stacked structure through covering the part of the detection signal wirings 241 to 244 facing with the shield electrodes 151 to 154 with the insulating material 32.

As the methods for forming the detection signal wirings 241 to 244, there are a method which patterns ITO or the like by photolithography at the time of manufacturing the CF substrate 11 and a method which uses a conductive material such as silver paste like the method for forming the detection electrodes 131 to 134. The cover on the detection signal wirings 241 to 244 using the insulating material 32 can be formed by a method that executes patterning by photolithography, screen printing, or the like at the time of manufacturing the CF substrate 11.

With the third exemplary embodiment, following effects can be provided: it is unnecessary to increase the size of the external shape of the TFT substrate 21 since the detection wirings 241 to 244 are disposed on the CF substrate 11; it is possible to prevent damages to the detection signal wirings 241 to 244 since the detection signal wirings 241 to 244 are covered by the insulating material 32; and the like. Other structures, operations, and effects of the third exemplary embodiment are same as those of the first and second exemplary embodiments.

FIG. 27 shows fragmentary sectional views showing a manufacturing method of a touch panel and a display device according to a fourth exemplary embodiment, in which steps are executed in order of FIG. 27A to FIG. 27E. FIG. 28 shows fragmentary sectional views showing the manufacturing method of the touch panel (CF substrate) according to the fourth exemplary embodiment, in which steps are executed in order of FIG. 28A to FIG. 28D. Hereinafter, explanations will be provided by referring to those drawings. For making it easy to understand, same reference numerals as those of the structural elements of the first exemplary embodiment are applied to the structural elements of the fourth exemplary embodiment as long as the functions thereof are the same even if the shapes are different from those of the structural elements of the first exemplary embodiment.

A display device 40 of the fourth exemplary embodiment is in a structure in which: the detection signal wirings 241 to 244 are covered by an insulating material 41; the shield signal wiring 23 is provided on the insulating material 41; and another insulating material 42 is filled between the conductive frame 14, the CF substrate 11, and the TFT substrate 21.

Figure 27A:
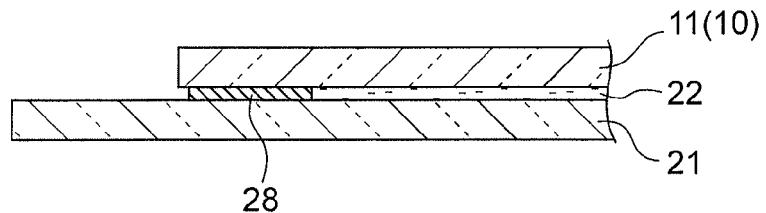
FIGS. 27A to 27E show fragmentary sectional views showing a manufacturing method of a touch panel and a display device according to a fourth exemplary embodiment, in which steps are executed in order of FIG. 27A to FIG. 27E.
Figure 27B:
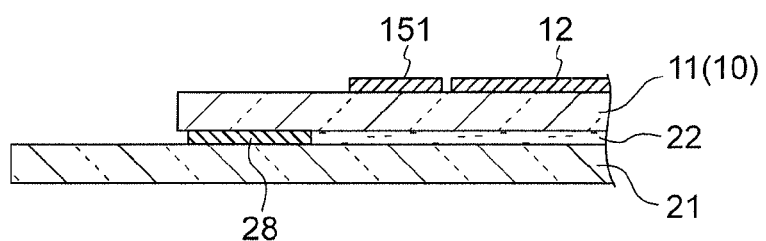
Figure 27C:
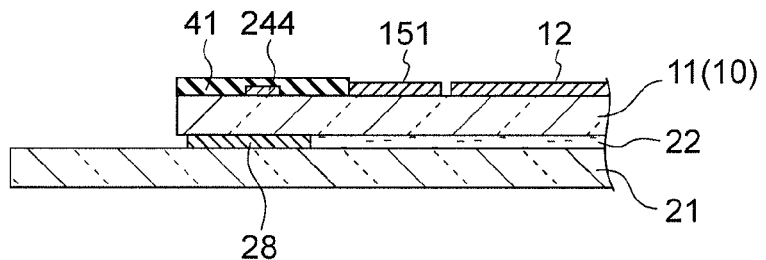
Figure 27D:
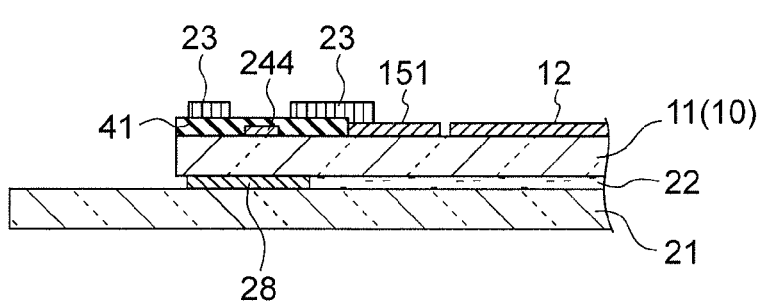
Figure 28A:
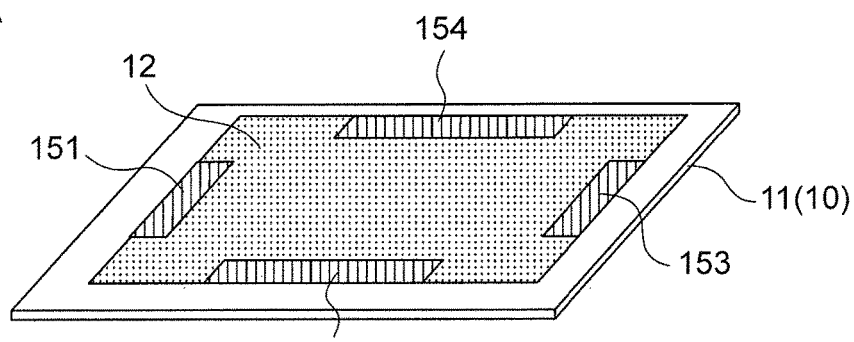
FIGS. 28A to 28D show fragmentary sectional views showing the manufacturing method of the touch panel (CF substrate) according to the fourth exemplary embodiment, in which steps are executed in order of FIG. 28A to FIG. 28D.
Figure 28B:
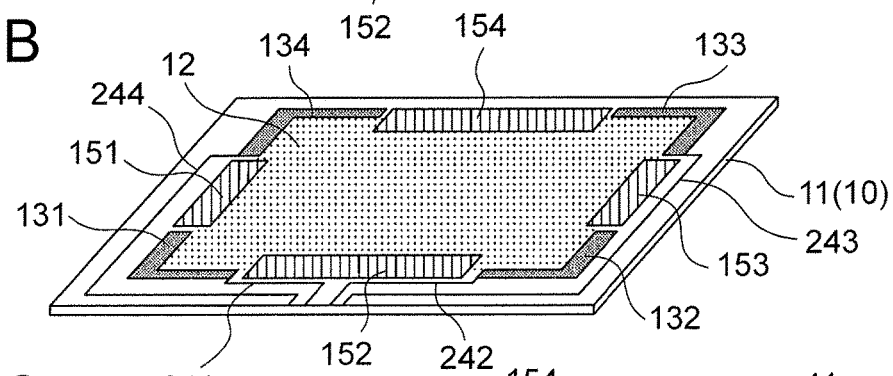
Figure 28C:
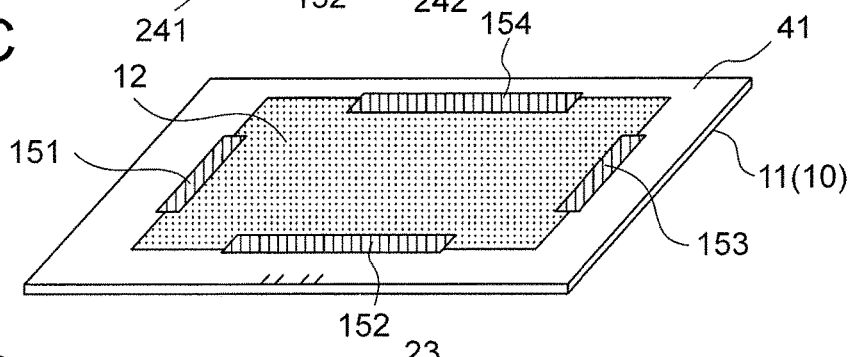
Figure 28D:
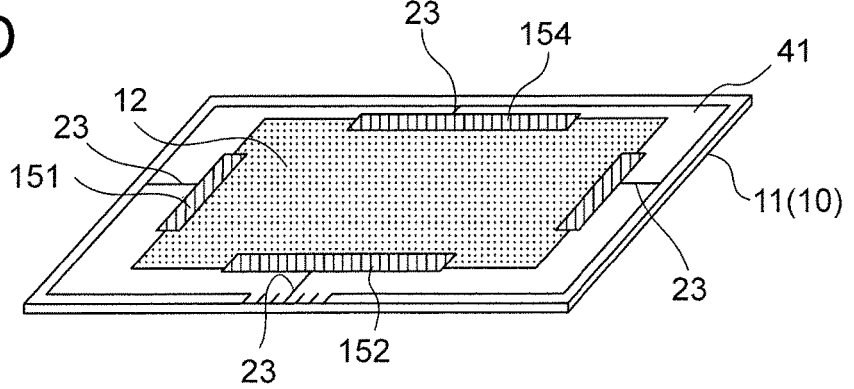
Figure 29A:
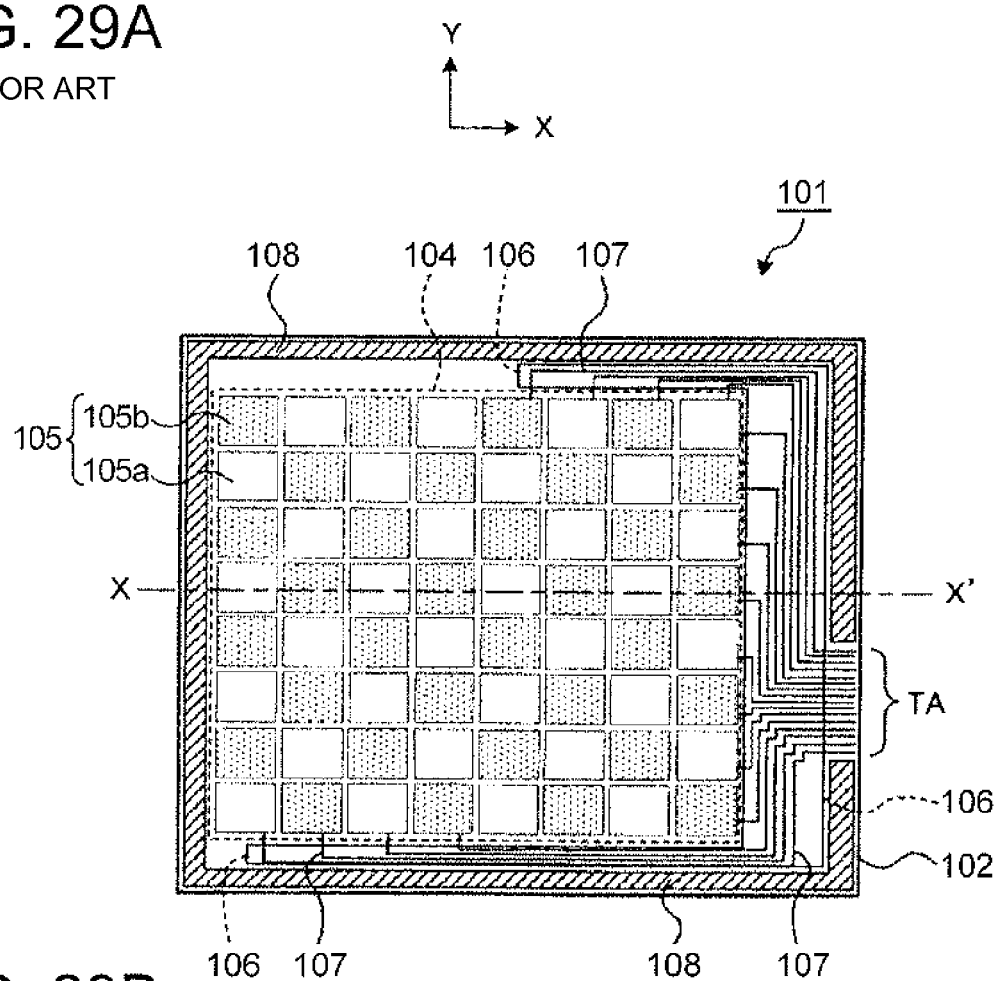
Figure 29B:
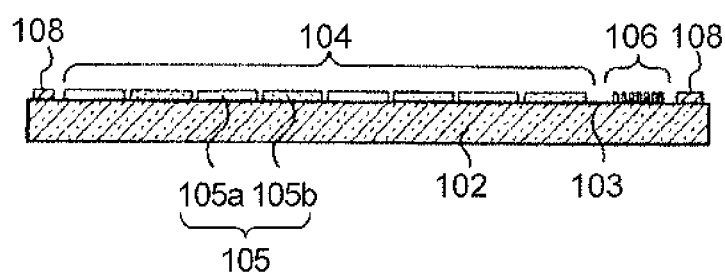
Figure 30:
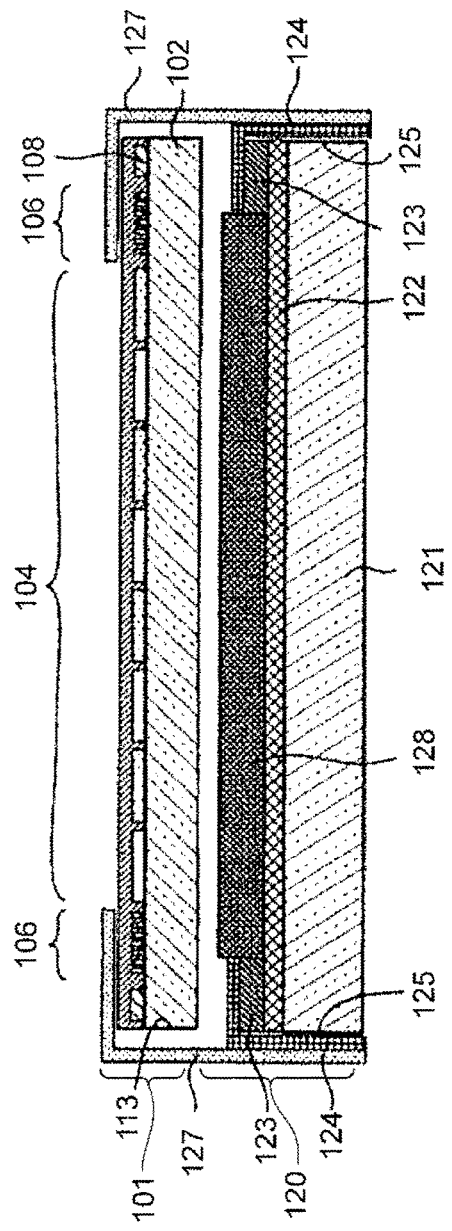
FIG. 30 is a sectional view showing a touch panel and a display device according to a related technique 2.

The method for manufacturing the display device 40 according to the fourth exemplary embodiment is as follows. First, as shown in FIG. 27A, the CF substrate 11 is laminated to the TFT substrate 21. Subsequently, as shown in FIG. 27B and FIG. 28A, the detection region 12 and the shield electrodes 151 to 154 are formed on the surface of the CF substrate 11. Subsequently, as shown in FIG. 28B, the detection electrodes 131 to 134 and the detection signal wirings 241 to 244 are formed further on the surface of the CF substrate 11. Then, as shown in FIG. 27C and FIG. 28C, the insulating material 41 is placed to cover over the detection signal wirings 241 to 244. Subsequently, as shown in FIG. 27D and FIG. 28D, the shield signal wiring 23 is formed on the insulating material 41 to be in contact with the shield electrodes 151 to 154. At last, the periphery of the CF substrate 11 is covered by the conductive frame 14, and the insulating material 42 is filled between the conductive frame 14, the TFT substrate 21, and the CF substrate 11 to complete the display device 40.

The insulating material 42 is constituted with an insulating resin, for example, and it is desirable to have the hardness of the extent (e.g., about the rubber hardness of A60 to A90) with which deformation of the conductive frame 14 is lightened. Further, when the insulating material 42 is of the light-shielding material in black or the like in color, it is possible to shield the light transmitted from the gap between the conductive frame 14, the TFT substrate 21, and the CF substrate 11 and to make the shield signal wirings 23 and the like of the CF substrate 11 invisible. As the insulating material 42, a paste material or a tape material may be used. In a case of using the paste material, it is filed in the gaps between the conductive frame 14, the TFT substrate 21, and the CF substrate 11. In a case of using the tape material, it is laminated on the bottom face of the conductive frame 14 and the top faces of the TFT substrate 21 and the CF substrate 11.

In a case of using a thermosetting resin or a moisture curing resin as the paste material, the conductive frame 14 may be formed with a material having the light shielding property. In the meantime, when using a photosetting resin such as an UV (Ultra Violet) curing resin as the paste material, the conductive frame 14 is required to be formed with a material that transmits UV light and the like.

Figure 27E:
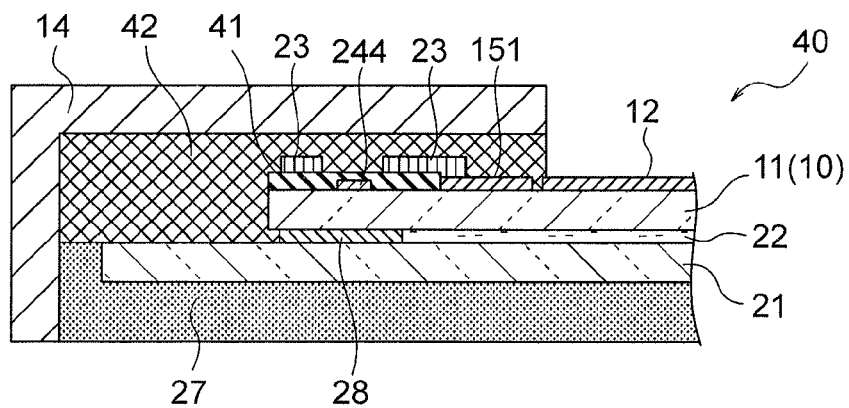

The fourth exemplary embodiment provides the following effects through filling the insulating material 42 thoroughly between the conductive frame 14, the TFT substrate 21, and the CF substrate 11 as shown in FIG. 27E. It is possible to suppress deformation of the conductive frame 14. It is possible to prevent intrusion of foreign matters between the conductive frame 14, the TFT substrate 21, and the CF substrate 11. It is possible to prevent damages to the shield signal wiring 23, the detection signal wirings 241 to 244, and the like disposed on the CF substrate 11. It is possible to prevent the shield signal wiring 23 from being electrically connected to the conductive frame 14. It is unnecessary to form the wirings on the TFT substrate 21. Other structures, operations, and effects of the fourth exemplary embodiment are same as those of the first to third exemplary embodiments.

While the present invention has been described above by referring to each of the exemplary embodiments, the present invention is not limited only to each of the exemplary embodiments described above. Regarding the structures and details of the present invention, various changes and modifications occurred to those skilled in the art can be applied. Further, the present invention includes the structures acquired by mutually and properly combining a part of or a whole part of the structures of each of the above-described exemplary embodiments.

While a part of or a whole part of the exemplary embodiments described above can be summarized as follows, the present invention is not limited only to the following structures.

(Supplementary Note 1)

A touch panel which includes:
a substrate;
a detection region formed in a center side of the substrate, which generates a detection signal according to a contact position of a conductor;
a plurality of detection electrodes formed in a fringe side of the substrate, which output the detection signal generated in the detection region;
a conductive frame that covers above an outer side of the detection region on the substrate; and
a shield electrode formed on the outer side of the detection region and between each of the plurality of detection electrodes, to which a shield signal that shields an electric influence on the detection region is supplied, wherein
distance from the detection region to the shield electrode is shorter than distance from the detection region to the conductive frame.

(Supplementary Note 2)

The touch panel as depicted in Supplementary Note 1, wherein
an insulating material is filled between the substrate and the conductive frame.

(Supplementary Note 3)

The touch panel as depicted in Supplementary Note 1 or 2, wherein
the shield signal is a signal that is of an equivalent frequency and voltage level as those of a reference signal that corresponds to the detection signal when there is no contact of the conductor.

(Supplementary Note 4)

The touch panel as depicted in Supplementary Note 1 or 2, wherein
the shield signal is a ground potential.

(Supplementary Note 5)

A display device which includes the touch panel depicted in any one Supplementary Notes 1 to 4.

(Supplementary Note 6)

The display device as depicted in Supplementary Note 5 being a liquid crystal display device, which includes:
as the touch panel, a color filter substrate on which a color filter is formed;
a thin film transistor substrate on which thin film transistors are formed; and
a liquid crystal layer sandwiched between the color filter substrate and the thin film transistor substrate.

(Supplementary Note 7)

The display device as depicted in Supplementary Note 6, which further includes a shield signal wiring formed on the thin film transistor substrate for supplying the shield signal to the shield electrode, wherein
the shield signal wiring is electrically connected to the shield electrode by a conductive material provided between the thin film transistor substrate and the color filter substrate.

(Supplementary Note 8)

The display device as depicted in Supplementary Note 6 or 7, which further includes a detection signal wiring which is formed on the color filter substrate, electrically connected to the detection electrodes, and covered by an insulating material for electrically insulating it from the shield electrode and the conductive material, wherein
distance from the detection region to the shield electrode is shorter than distance from the detection region to the detection signal wiring.

(Supplementary Note 9)

A touch panel which includes a detection region formed on a surface of a surface substrate, a plurality of detection electrodes formed in the periphery of the detection region, and a conductive frame constituted with a conductive material which covers above the periphery of the detection region, and the touch panel further includes:
shield electrodes for electrically isolating the detection region and the detection electrodes placed between each of the plurality of detection electrodes in the periphery of the detection region and at one point or more at positions closer to the detection region that the distance from the detection region to the conductive frame; and
a shield signal wiring which supplies a shield signal for shielding an electric influence to the shield electrodes.

(Supplementary Note 10)

A touch panel which includes a detection region formed on a surface of a surface substrate, a plurality of detection electrodes formed in the periphery of the detection region, and a conductive frame constituted with a conductive material which covers above the periphery of the detection region, and the touch panel further includes:
shield electrodes for electrically isolating the detection region and the detection electrodes placed between each of the plurality of detection electrodes in the periphery of the detection region and at one point or more at positions closer to the detection region that the distance from the detection region to the conductive frame; and
a shield signal wiring for grounding the shield electrodes.

(Supplementary Note 11)

The touch panel as depicted in Supplementary Note 9 or 10, wherein
an insulating material is disposed in a gap between the conductive frame and the touch panel.

(Supplementary Note 12)

A display device which includes the touch panel as depicted in Supplementary Note 9, 10 or 11.

(Supplementary Note 13)

The display device which includes the touch panel as depicted in Supplementary Note 12, wherein the detection region, the detection electrodes, and shield electrodes are formed on the surface of a color filter substrate as the surface substrate.

(Supplementary Note 14)

The display device which includes the touch panel as depicted in Supplementary Note 12, and the display device further includes:
a substrate on which the shield signal wiring is provided; and
a conductive material which is provided between the substrate and the surface substrate for electrically connecting the shield signal wiring and the shied electrodes.

(Supplementary Note 15)

The display device which includes the touch panel as depicted in Supplementary Note 12, and the display device further includes:
a detection signal wiring which is covered by an insulating material so as not to be electrically connected to the shield electrodes, electrically connected to the detection electrodes, and provided at a point farther from than the distance from the detection region to the shield electrodes on the surface substrate.

The present invention is applicable to a touch panel of a capacitance type, for example, and to a display device having the touch panel such as a liquid crystal display device, an EL (Electro Luminescence) display device, or the like.

What is claimed is:

1. A display device including a touch panel, the touch panel comprising:
a substrate;
a detection region formed on the substrate, for generating a detection signal according to a contact position of a conductor;
a plurality of detection electrodes formed on the substrate outside the detection region, for outputting the detection signal generated in the detection region;
a transparent conductive frame above an outer perimeter of the detection region on the substrate; and
a transparent shield electrode formed on a same surface on the touch panel as the detection region, on the outer perimeter of the detection region and between each of the plurality of detection electrodes,
wherein a distance from the detection region to the shield electrode is shorter than a distance from the detection region to the transparent conductive frame.

2. The display device as claimed in claim 1, wherein a shield signal is applied to the transparent shield electrode, and
the shield signal is a signal that is of an equivalent frequency and voltage level as those of a reference signal that corresponds to the detection signal when there is no contact of the conductor.

3. The display device as claimed in claim 1, wherein a shield signal is applied to the transparent shield electrode, and
the shield signal is a ground potential.

4. The display device as claimed in claim 1, wherein the display device is a liquid crystal display device, comprising:
as the touch panel, a color filter substrate on which a color filter is formed;
a thin film transistor substrate on which thin film transistors are formed; and
a liquid crystal layer sandwiched between the color filter substrate and the thin film transistor substrate.

5. The display device as claimed in claim 4, further comprising a shield signal wiring formed on the thin film transistor substrate for supplying a shield signal to the shield electrode, wherein
the shield signal wiring is electrically connected to the shield electrode by a conductive material provided between the thin film transistor substrate and the color filter substrate.

6. The display device as claimed in claim 5, further comprising a detection signal wiring which is formed on the color filter substrate, electrically connected to the detection electrodes, and covered by an insulating material for electrically insulating it from the shield electrode and the conductive material, wherein
- a distance from the detection region to the shield electrode is shorter than a distance from the detection region to the detection signal wiring.

7. The display device as claimed in claim 1, wherein
the distance from the detection region to the transparent conductive frame is changed by deformation of the transparent conductive frame or the substrate.

8. The display device as claimed in claim 1, wherein
the distance from the detection region to the transparent conductive frame is changed by weight added to the detection region at a time of a touch operation.

9. The display device as claimed in claim 1, wherein
a space from the detection region to the transparent conductive frame is hollow.

10. The display device as claimed in claim 7, wherein
an insulating material is filled between the substrate and the transparent conductive frame.

11. The display device as claimed in claim 10, wherein
the insulating material has a hardness of an extent with which the deformation is lightened.

12. The display device as claimed in claim 1, wherein
capacitance between the shield electrode and the detection region is larger than capacitance between the transparent conductive frame and the detection region.

* * * * *